US012776944B2

(12) United States Patent
Cloutier et al.

(10) Patent No.: US 12,776,944 B2
(45) Date of Patent: Oct. 27, 2026

(54) ASYNCHRONOUS INCIDENT RESPONSE ACTIONS

(71) Applicant: PagerDuty, Inc., San Francisco, CA (US)

(72) Inventors: Andre Cloutier, Toronto (CA); Satya Chandu Dheeraj Balakavi, Folsom, CA (US); Chris A. McClurg, Alameda, CA (US); Sajeevan Yogeswaran, Clarington (CA); Manisha Verma, Brampton (CA); Yana Lebedeva, Guelph (CA)

(73) Assignee: PagerDuty, Inc., San Francisco, CA (US)

( * ) Notice: Subject to any disclaimer, the term of this patent is extended or adjusted under 35 U.S.C. 154(b) by 71 days.

(21) Appl. No.: 19/042,922

(22) Filed: Jan. 31, 2025

(65) Prior Publication Data

US 2026/0230373 A1 Aug. 6, 2026

(51) Int. Cl.

| | |
|---|---|
| ***H04L 41/0631*** | (2022.01) |
| ***H04L 41/069*** | (2022.01) |
| ***H04L 41/50*** | (2022.01) |
| ***H04L 43/04*** | (2022.01) |

(52) U.S. Cl.

CPC ........ *H04L 41/0631* (2013.01); *H04L 41/069* (2013.01); *H04L 41/5032* (2013.01); *H04L 43/04* (2013.01)

(58) Field of Classification Search

CPC .... H04L 41/0631; H04L 41/069; H04L 43/04

See application file for complete search history.

(56) References Cited

U.S. PATENT DOCUMENTS

| | | | | |
|---|---|---|---|---|
| 2008/0263009 | A1* | 10/2008 | Buettner ........... | G06F 16/90335 707/E17.14 |
| 2016/0255158 | A1* | 9/2016 | Lowry .................. | H04L 67/146 709/227 |
| 2022/0113871 | A1* | 4/2022 | Paduroiu ................. | G06F 3/067 |

OTHER PUBLICATIONS

Flink, "Stateful Stream Processing", Oct. 15, 2024, https://web.archive.org/web/20241015092113/https://nightlies.apache.org/flink/flink-docs-stable/docs/concepts/stateful-stream-processing/ (Year: 2024).*

"Apache Flink", Apache Flink, 7 pp., Retrieved from the Internet on May 13, 2025 from URL: https://flink.apache.org/.

"Apache Kafka", Kafka, 4 pp., Retrieved from the Internet on May 13, 2025 from URL: https://kafka.apache.org/.

(Continued)

*Primary Examiner* — Hieu T Hoang

(74) *Attorney, Agent, or Firm* — Shumaker & Sieffert, P.A.

(57) ABSTRACT

Techniques are described for asynchronous incident response actions. An example system includes a memory that stores instructions and one or more processors that execute the instructions to: process, with an event processing module, indications of events from a monitored system to generate an events data stream; transform, with an alert processing module and based on account settings data from an accounts settings data stream, events data from the events data stream into one or more alerts to generate at least a portion of an alerts data stream, the events data corresponding to an offset within the events data stream; map, with an incident mapping module and based on alerts data from the alerts data stream, the one or more alerts to an incident; and store, with the incident mapping module and to a storage device, an indication of the offset within the events data stream.

20 Claims, 11 Drawing Sheets

(56) References Cited

OTHER PUBLICATIONS

"Maintenance Windows", PagerDuty, 12 pp., Retrieved from the Internet on May 13, 2025 from URL: https://support.pagerduty.com/main/docs/maintenance-windows.
"Network memory tuning guide", Flink, vol. 2, No. 1, 6 pp., Retrieved from the Internet on May 13, 2025 from URL: https://nightlies.apache.org/flink/flink-docs-master/docs/deployment/memory/network_mem_tuning/.
"Services and Integrations", PagerDuty, 8 pp., Retrieved from the Internet on May 13, 2025 from URL: https://support.pagerduty.com/main/docs/services-and-integrations.
"Stateful Functions: A Platform-Independent Stateful Serverless Stack", Stateful Functions, vol. 3, No. 4, 2 pp., Retrieved from the Internet on May 13, 2025 from URL: https://nightlies.apache.org/flink/flink-statefun-docs-master/.
"Stateful Stream Processing", Flink, vol. 2, No. 1, 9 pp., Retrieved from the Internet on May 13, 2025 from URL: https://nightlies.apache.org/flink/flink-docs-master/docs/concepts/stateful-stream-processing/.
"Trial Account Onboarding", PagerDuty, 5 pp., Retrieved from the Internet on May 13, 2025 from URL: https://support.pagerduty.com/main/docs/trial-account-onboarding.
Nowojski et al., "Faster checkpointing through unaligned checkpoints—Piotr Nowojski", Flink Forward, YouTube, Oct. 15, 2019, 2 pp., URL: https://www.youtube.com/watch?v=-ABPHMhrecQ.
Ricther et al., "Managing Large State in Apache Flink: An Intro to Incremental Checkpointing", Apache Flink, Jan. 30, 2018, 5 pp., URL: https://flink.apache.org/2018/01/30/managing-large-state-in-apache-flink-an-intro-to-incremental-checkpointing/.
Tai et al., "Stateful Functions: Polyglot Event-Driven Functions for Stateful Distributed Applications—Tai", Flink Forward, YouTube, Apr. 28, 2020, 2 pp., URL: https://www.youtube.com/watch?v=tuSylBadNSo.

* cited by examiner

ASYNCHRONOUS INCIDENT RESPONSE ACTIONS

TECHNICAL FIELD

This disclosure relates generally to asynchronous incident response actions.

BACKGROUND

Operations computing systems may receive events from one or more customer systems and determine which events may be classified as alerts. Operations computing systems may process alerts to determine an incident that prompts on-call responders to address any disruption to a service of a customer system.

SUMMARY

Aspects of the present disclosure describe techniques for asynchronous incident response actions. In some examples, an operations computing system may asynchronously process events from monitored systems by processing the events through one or more modules, where each module may asynchronously perform processing tasks independently of other modules. For instance, an event processing module, account settings module, alert processing module, incident mapping module, and alert repository module may each perform different tasks independently of one another. As such, individual modules may continuously process events received from monitored systems and thereby continuously output units of data to their respective data streams. For example, the account settings module may continuously process account settings and thereby continuously output units of account settings data to account settings data stream without waiting for alert processing module or other modules to complete their respective processing tasks. The operations computing system may pass tracked metadata between modules, such as to trace and/or log the propagation of an event through the modules.

The operations computing system may represent an eventually consistent system in that a received event may be considered processed when the event fully propagates through the modules of the operations computing system. Prior to the event being fully propagated, data corresponding to the event may not be consistent. For example, a first data stream may include updated data as compared to a second data stream until the updated data propagates through one or more modules to the second data stream. In this manner, the operations computing system transforms stateless data into stateful data by propagating data through modules of the operations computing system. By processing in an eventually consistent manner (e.g., asynchronously) as compared to a strongly consistent manner, the operations computing system may more efficiently (e.g., with high throughput and low latency) process events and thereby increase the number of events the operations computing system can process.

In one example, a method includes aggregating, by an account settings module of a computing system, a plurality of account settings to generate an account settings data stream; processing, by an event processing module of the computing system, a plurality of indications of events from a monitored system to generate an events data stream; transforming, by an alert processing module of the computing system and based on account settings data from the accounts settings data stream, events data from the events data stream into one or more alerts to generate at least a portion of an alerts data stream, the account settings data corresponding to an offset within the accounts settings data stream and the events data corresponding to an offset within the events data stream; mapping, by an incident mapping module of the computing system and based on alerts data from the alerts data stream, the one or more alerts to an incident; and storing, by the incident mapping module and to a storage device, an indication of the offset within the events data stream along with an indication of the incident, wherein the offset within the events data stream corresponds to an offset from a sequence of offsets within the events data stream, each offset from the sequence of offsets within the events data stream representing a respective position for one or more units of data within the events data stream.

In another example, a computing system includes a memory that stores instructions; one or more processors that execute the instructions to: aggregate, with an account settings module, a plurality of account settings to generate an account settings data stream; process, with an event processing module, a plurality of indications of events from a monitored system to generate an events data stream; transform, with an alert processing module and based on account settings data from the accounts settings data stream, events data from the events data stream into one or more alerts to generate at least a portion of an alerts data stream, the account settings data corresponding to an offset within the accounts settings data stream and the events data corresponding to an offset within the events data stream; map, with an incident mapping module and based on alerts data from the alerts data stream, the one or more alerts to an incident; and store, with the incident mapping module and to a storage device, an indication of the offset within the events data stream along with an indication of the incident, wherein the offset within the events data stream corresponds to an offset from a sequence of offsets within the events data stream, each offset from the sequence of offsets within the events data stream representing a respective position for one or more units of data within the events data stream.

In yet another example, non-transitory computer-readable storage media includes instructions that, when executed by one or more processors, cause the one or more processors to: aggregate, with an account settings module, a plurality of account settings to generate an account settings data stream; process, with an event processing module, a plurality of indications of events from a monitored system to generate an events data stream; transform, with an alert processing module and based on account settings data from the accounts settings data stream, events data from the events data stream into one or more alerts to generate at least a portion of an alerts data stream, the account settings data corresponding to an offset within the accounts settings data stream and the events data corresponding to an offset within the events data stream; map, with an incident mapping module and based on alerts data from the alerts data stream, the one or more alerts to an incident; and store, with the incident mapping module and to a storage device, an indication of the offset within the events data stream along with an indication of the incident, wherein the offset within the events data stream corresponds to an offset from a sequence of offsets within the events data stream, each offset from the sequence of offsets within the events data stream representing a respective position for one or more units of data within the events data stream.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

Like reference characters denote like elements throughout the text and figures.

DETAILED DESCRIPTION

Figure 1:
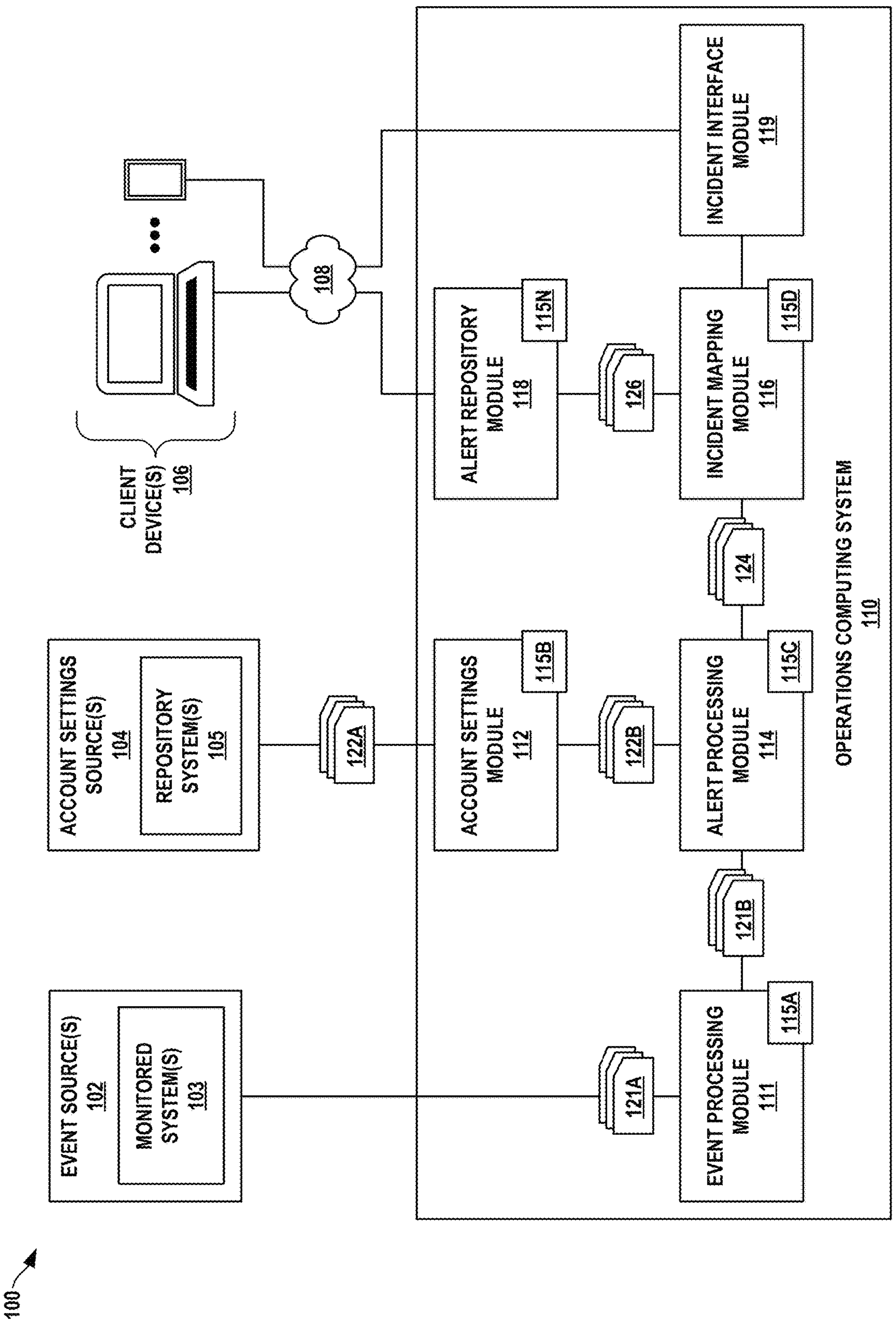
FIG. 1 is a block diagram illustrating a first example of a system for asynchronous incident response actions, in accordance with the techniques of this disclosure.

FIG. 1 is a block diagram illustrating a first example of a system 100 for asynchronous incident response actions, in accordance with the techniques of this disclosure. In the example of FIG. 1, system 100 may include operations computing system 110, one or more event sources 102, one or more account settings sources 104, and one or more client devices 106. System 100 may include network 108 that facilitates communication between elements of system 100. As shown in the example of FIG. 1 for instance, operations computing system 110 and clients 106 may communicate data through network 108.

Network 108 may include any public or private communication network, such as a cellular network, WI-FI network, or other type of network for transmitting data between computing devices. In some examples, network 108 may include one or more packet switched networks, such as the Internet. Network 108 may include network hubs, network switches, network routers, terrestrial and/or satellite cellular networks, etc., that are operatively inter-coupled thereby providing for the exchange of information between elements of system 100. In some examples, network 108 may include one or more network links or connections, such as Ethernet, WI-FI, BLUETOOTH, or other wired or wireless network connections. Though shown as facilitating communication between operations computing system 110 and clients 106, network 108 may facilitate communication between operations computing system 110 and other elements of system 100, including event sources 102, account settings sources 104, or other systems or devices. For example, operations computing system 110, event sources 102, account settings sources 104, client devices 106, and other systems or devices, or various subsets thereof may be operatively coupled to network 108 using respective network links and send and receive data across network 108 using any suitable communication techniques.

Event sources 102 may include monitored systems 103 that may be customer or other systems which generate events. Monitored systems 103 may be managed by an administrator of system 100. In some examples, event sources 102 may include cloud service providers, corporations, banks, retailers, non-profit organizations, or other entities. Each of event sources 102 may respectively represent a different customer or entity, such as cloud service providers, corporations, retailers, etc. Monitored systems 103 may represent virtual or physical servers, cloud computing services, workstations, clusters, virtual or physical network devices, software as a service (SaaS), network as a service (NaaS), or other computing devices or systems. Though not shown, monitored systems 103 may provide one or more services via network 108. Monitored systems 103 may include a collection of hardware devices, software components, and/or storage devices that can be used to implement one or more applications or services related to business operations of respective event sources 102. In some examples, monitored systems 103 may include server computers, mainframes, laptop computers, desktop computers, tablet computers, Internet of Things (IoT) devices, or the like.

Monitored systems 103 may provide various services (e.g., web services, software services, logging services, monitoring services, communication services, networking services) for customers. Such services may be integrated with or include a data monitoring tool configured to detect events corresponding to the operation (e.g., functionality, configuration) of such services and send units of events data to operations computing system 110, such as in the form of events data stream 121A. In this manner, monitored systems 103 may detect events that indicate occurrences (e.g., configuration or other changes to the operation of services) during the operation of services provided by monitored systems 103 and report such events to operations computing system 110. In some examples, monitored systems 103, such as through the data monitoring tool, may normalize events, such as according to a pre-defined incident response standard such that events data stream 121A contains units of events data compatible with event processing module 111 of operations computing system 110.

Account settings sources 104 may include repository systems 105 that may be administrator, customer or other systems which store settings information used by operations computing system 110 to provide asynchronous incident response actions. Each of account settings sources 104 may respectively represent a different customer or entity, such as cloud service providers, corporations, banks, retailers, non-profit organizations, or other entities that may provide account settings that govern the operation of operations computing system 110 for the entity. Repository systems 105 may represent virtual or physical storage devices, servers, cloud storage services, workstations, clusters, virtual or physical network devices, SaaS, NaaS, or other computing devices or systems that may store and/or communicate account settings from account settings sources 104 to operations computing system 110. Though not shown, repository systems 105 may communicate account settings via network 108. Repository systems 105 may include a collection of hardware devices, software components, and/or storage devices that can be used to implement one or more applications or services related to storing and/or providing account settings corresponding to respective account settings sources 104. In some examples, repository systems 105 may include storage servers, storage clusters, network attached storage (NAS), laptop computers, desktop computers, tablet computers, server computers, mainframes, or other systems or devices capable of storing and communicating account settings.

In some examples, an event source of event sources 102 and an account settings source of account settings sources 104 may correspond to the same source. For instance, the event source and the account settings source may represent the same customer or entity, such as the same cloud service provider, corporation, bank, retailer, non-profit organization, or other entity. As such, the event source and account settings source of one or more of monitored systems 103 and one or more of repository systems 105, respectively, may be the same source (e.g., be the same customer or entity).

Client devices 106 may represent computing devices, such as laptop computers, desktop computers, tablet computers, mobile phones (e.g., smart phones), wearable computing devices (e.g., smart watches), or other computing devices that users may use to interact with operations computing system 110. For example, client devices 106 may facilitate communication between users and operations computing system 110. For instance, users may receive alert and/or incident notifications from operations computing system 110, manage (e.g., configure, operate) operations computing system 110, perform user actions at operations computing system 110, or otherwise interact with operations computing system 110 through client devices 106. As such, client devices 106 may represent the client of a client/server architecture where operations computing system 110 represents the server of the architecture.

Operations computing system 110 may implement various techniques for asynchronous incident response actions. For example, operations computing system 110 may receive various events from monitored systems 103, receive various account settings from repository systems 105, or both. As will be described herein, operations computing system 110 may asynchronously receive event actions, determine one or more alerts, assign one or more alerts to one or more alert sets, map one or more alert sets to incidents, notify users about alerts and/or incidents, store alert information about one or more alerts, receive user actions to resolve or otherwise manage one or more alerts, or various subsets thereof in connection with events from one or more of monitored systems 103. Operations computing system 110 may perform these operations according to the account settings from repository systems 105. Event actions may represent actions resulting from events and generally affect alerts, which in turn influence incidents. User actions may represent an asynchronous action stream and affect incidents and, subsequently, influence alerts.

Operations computing system 110 may monitor the operation of monitored systems 103. For example, operations computing system 110 may be arranged to receive events from monitored systems 103 that indicate when applications or other services of monitored systems 103 are not operating normally and asynchronously generate notifications indicating the same in accordance with account settings from repository systems.

Operations computing system 110 may represent one or more computing systems, such as one or more physical or virtual servers, desktop computers, laptop computers, mainframes, cloud computing systems, etc. capable of sending information to and receiving information from monitored systems 103, repository systems 105, and client devices 106, or various subsets thereof. Operations computing system 110 may execute computer-readable instructions to provide asynchronous incident response actions. For example, operations computing system 110 may include one or more event processing modules 111, one or more account settings modules 112, one or more alert processing modules 114, one or more alert repository modules 118, one or more incident mapping modules 116, and one or more incident interface modules 119, or various subsets thereof that operations computing system 110 may execute to provide asynchronous incident response actions.

To process events asynchronously, operations computing system 110 may receive, process, and output data with one or more data streams. Operations computing system 110 may receive, from monitored systems 103 and at event processing module 111, events in the form of one or more events data streams 121A-121B (collectively, "events data streams 121"). Events may represent occurrences at monitored system 103 that may require a response from an administrator of monitored systems 103, such as to repair or restore normal operation of one or more services provided by monitored systems 103. Some example events include high latency (e.g., latency above a latency threshold), high error rates (e.g., hypertext transfer protocol (HTTP) 5XX errors above an error threshold), unresponsiveness, configuration changes, or the like at monitored systems 103. In some examples, event processing module 111 may normalize, transform, or otherwise process one or more units of events data representing events from monitored systems 103 to generate events data stream 121B. For instance, one or more units of events data may represent an event fanout (e.g., separation of various information corresponding to an event into unit(s) of events data). Though not shown, in other examples, operations computing system 110 may receive, such as at alert processing module 114, events data stream 121A from monitored systems 103. In these other examples, event processing module 111 may be optional (e.g., may not be provided), alert processing module 114 may process, such as described herein with respect to event processing module 111, events data stream 121A, or both.

In some examples, event processing module 111 may receive, from monitored systems 103, events that include alerts regarding system errors, warnings, failure reports, customer service requests, status messages, or the like from monitored systems 103. Event processing module 111 may be configured to process events represented by variously formatted messages that reflect the occurrence of events and/or incidents that have occurred at monitored systems 103. Events processing module 111 may receive events in the form of text messages, HTTP requests or posts, application programming interface (API), calls, log file entries, trouble tickets, emails, or other indications of events.

Operations computing system 110 may receive, from repository systems 105 and at account settings module 112, account settings in the form of an account settings data stream 122A. Account settings data streams 122A-122B (collectively, "account settings data streams 122") may include account settings that govern at least some aspects of the operation of operations computing system 110. For example, account settings may include user information including criteria for identifying one or more subsets of users from a plurality of users for notification purposes, transformation information including criteria for transforming events into one or more alerts, grouping information including criteria for assigning individual alerts to respective alert sets, and/or mapping information including criteria for mapping respective alert sets to incidents. In some examples, account settings module 112 may aggregate, normalize, or otherwise process one or more units of account settings data from account settings data stream 122A from repository systems 105 to generate account settings data stream 122B. Though not shown, in other examples, operations computing system 110 may receive, such as at alert processing module 114, account setting data stream 122A from repository systems 105. In these other examples, account settings module 112 may be optional (e.g., may not be provided), alert processing module 114 may process, such as described herein with respect to account settings module 112, account settings data stream 122A, or both.

In addition to receiving data streams from monitored systems 103, repository system 105, or both, operations computing system 110 may use (e.g., generate, communicate, process) data streams internally, such as between modules (e.g., modules 111, 112, 114, 116, 118) or other elements of operations computing system. For example, event processing module 111 may output data, such as one or more units of events data to events data stream 121B, account settings module 112 may output data, such as one or more units of account settings data to account settings data stream 122B, or both.

Alert processing module 114 may receive events data stream 121B (or events data stream 121A) and/or account settings data stream 122B (or account settings data stream 122A) and output data, such as one or more units of alerts data to an alerts data stream 124. Incident mapping module 116 may receive alerts data stream 124 and output data, such as one or more units of alert updates data to alert updates data stream 126. Alert repository module 118 may receive alert updates data stream 126 and store alert information determined from alert updates data stream 126, such as to a storage device of operations computing system 110. The alert information may be a repository of information about alerts based on one or more units of alert updates data from alert updates data stream 126. For example, the alert information may store the content, type, status (e.g., sent to a user, acknowledged by the user, resolved) or other characteristics of alerts generated by operations computing system 110. The alert information may indicate the incident, alert set, or both to which an alert is assigned.

In some examples, client devices 106 may receive at least a portion of the alert information from operations computing system 110, such as through alert repository module 118. For example, client devices 106 may query or retrieve a desired portion of the alert information (e.g., alert information about one or more particular alerts) through alert repository module 118. In some examples, alert repository module 118 may include a user interface (UI) backend (e.g., web server) that generates UIs for presentation at client devices 106. Such UIs may present interfaces including UI elements (e.g., buttons, controls, input boxes, text boxes, images) that present information and/or receive user input in connection with querying and/or presenting queried alert information. Alert repository module 118 may include an API to enable connection and communication between alert repository module 118 and client devices 106. Client devices 106 may also or alternatively receive notifications, which incident interface module 119 may send. For example, incident mapping module 116 may generate one or more alerts which incident interface module 119 may send to clients 106 to indicate to users at clients 106 that an incident has occurred at one or more of monitored systems 103.

Incident interface module 119 may communicate with client devices 106 such as to communicate with users of client devices 106. In some examples, incident interface module 119 may represent a UI backend (e.g., web server) that generates UIs for presentation at client devices 106. Such UIs may present interfaces including UI elements (e.g., buttons, controls, input boxes, text boxes, images) that present information and/or receive user input for managing or otherwise operating operations computing system 110. Incident interface module 119 may include an API to enable connection and communication between incident interface module 119 and client devices 106.

A data stream may include a sequence of units of data. As described above for example, events data streams 121 may include one or more units of events data that represent one or more events that occurred at monitored systems and account settings data streams 122 may include one or more units of account settings data that represent aggregated or other account settings that may govern the operation of operations computing system 110. Alerts data stream 124 may include one or more units of alerts data that identify respective alert sets including one or more alerts generated by alert processing module 114. Alert processing module 114 may generate the one or more units of alerts data by transforming events from one or more of events data streams 121 into one or more alerts (e.g., one or more alert sets), such as according to account settings from one or more of account settings data streams 122. Alert updates data stream 126 may include one or more units of alert updates data that indicate updates to the alert information stored by alert repository module 118. For example, one or more units of alert updates data may indicate whether a notification for one or more alerts and/or incidents has been sent, has been acknowledged, has been resolved (e.g., repaired, addressed), or another status of the one or more alerts and/or incidents.

In some examples, units of data in a data stream (e.g., data streams 121, 122, 124, 126) may be sequenced (e.g., ordered), such as based on time. For example, the first unit of data may occupy a first offset (e.g., position) within the data stream, a second unit of data may occupy a second offset within the data stream, a third unit of data may occupy a third offset within the data stream, and so on and so forth. These offsets may represent an ordered sequence, such as where the first offset may be positioned before the second offset, the second offset may be positioned before the third offset, the third offset may be positioned before a fourth offset, and so on and so forth. Operations computing system 110 may store data streams (e.g., data streams 121, 122, 124, 126), such as by storing the constituent elements of each respective data stream (e.g., the units of data of each respective data stream) to a storage device.

Data streams (e.g., data streams 121, 122, 124, 126) may be implemented by one or more data stream services, which operations computing system 110 may execute. For example, a data stream service may receive data and write the data to a respective data stream. For instance, events data stream 121B may include a data stream service that writes units of events data to events data stream 121B based on events from monitored systems 103, and account settings data stream 122B may include a data stream service that writes units of accounts settings data to account settings data stream 122B based on input from account settings module 112. Similarly, alerts data stream 124 may include a data stream service that writes units of alerts data to alerts data stream 124 based on input from alert processing module 114, alert updates data stream 126 may include a data stream service that writes units of alert updates data to alert updates data stream 126 based on input from incident mapping module 116.

In operation, account settings module 112 may aggregate (e.g., combine) account settings, including account settings for services (e.g., service configuration), maintenance windows (e.g., maintenance schedules), entitlements, and capabilities associated with an account (e.g., a customer). Account settings module 112 may consume units of account settings data from account settings data stream 122A. Account settings module 112 may generate, from account settings data stream 122A, optimized (e.g., aggregated, normalized) account settings and publish, to account settings data stream 122B, units of account settings data including the optimized account settings. The optimized account settings may increase the efficiency of alert processing module 114 in processing account settings.

Account settings module 112 may retrieve and aggregate account settings data from multiple sources, such as to create a unified view of account settings in account settings data stream 122B. Account settings module 112 may maintain state information for each account, such as in one or more units of account settings data in account settings data stream 122B, to ensure accurate and up-to-date account settings across all customer accounts. As a separate module of operations computing system 110 that may execute asynchronously, account settings module 112 may handle high data volumes with minimal delay, allowing for responsive processing and reduced lag.

Account settings module 112 may perform batching of large volumes of account settings data efficiently, such as by aggregating (e.g., combining) and publishing (e.g., outputting) one or more units of account settings data to account settings data stream 122B at predefined intervals, rather than processing every account settings change as account settings changes arrive at account settings module 112. In this manner, data flow is optimized reducing load on both account settings module 112 and its downstream modules (e.g., alert processing module 114, incident mapping module 116, alert repository module 118). By batching, account settings module 112 may minimize the number of state updates and network transmissions, addressing pipeline bottlenecks and easing system strain. Through batching, account settings module 112 may also optimize checkpointing processes by reducing the frequency at which state changes are captured, leading to faster, more efficient checkpoints. In this manner, account settings module 112 may achieve lower latency and enable operations computing system 110 to manage higher event volumes with less backpressure and fewer disruptions. As such, through batching, account settings module 112 may ensure that operations computing system 110 consistently maintains high throughput and low latency, even under heavy load conditions.

Batching performed by account settings module 112 may allow processing of high volumes of data efficiently. For example, a large number of customers (e.g., 1,000, 10,000) may generate high volumes of account settings data. Batching, as described herein, ensures that operations computing system 110 can process large amounts of data with minimal delay. As will be described further below, account settings module 112 may include a number of service functions 115A-115N (collectively, "service functions 115"), which may include a cluster (e.g., combination) of remote functions that communicate with one another using a communication protocol (e.g., HTTP). These service functions 115 may be partitioned by unique identifiers (e.g., service-id, maintenance-window-id, account-id, etc.) and may be accessed using the communication protocol (e.g., HTTP). This setup allows for distributed processing of account settings data. For example, during times of high event volumes, especially in the presence of significant data skew (e.g., a burst of service updates for one or a small subset of services), the account settings module 112 can experience backpressure. Such backpressure may slow down account settings processing, affecting not just the targeted account but all accounts, which may impact the overall performance of account settings module 112.

To overcome this problem, account settings module 112 may, for example, perform time-based batching of account settings. When a traffic spike occurs for an account within a predefined time interval, account settings may be aggregated and published in a more measured manner to account settings data stream 122B. Such batching may ensure that account settings (e.g., service/maintenance windows, entitlements, and capabilities updates) for an account (e.g., customer) are batched (e.g., aggregated) over the duration of the time interval and published together such as in a single unit of account settings data. This reduces the frequency of state updates and network transmissions, alleviating backpressure and improving system performance.

Reducing state update frequency lowers computational overhead, improving the efficiency of the state management system. As a result, account settings module 112 can handle higher volumes of data with reduced processing time and resource consumption, enhancing overall throughput. Batching, by account settings module 112, may significantly enhance checkpointing efficiency. For example, by consolidating state updates into larger, less frequent batches, the checkpointing process captures fewer state changes, leading to faster and more efficient checkpoints. The corresponding reduced overhead lowers overall latency, enabling the system to manage high event volumes with minimal backpressure and fewer disruptions.

Account settings module 112 may aggregate and order data within and across batches to ensure that related data points are processed in the correct sequence. For example, account settings module 112 may aggregate and order data within and across batches such that the data corresponds to the original order of events. In this manner, account settings module 112 maintains coherence in the output. The batching techniques performed by account settings module 112 preserve data integrity, ensuring that the aggregated data remains reliable and actionable. The batching techniques may be scalable, allowing account settings module 112 to manage increasing data volumes without compromising performance. As data loads grow, batching time intervals, batch size limits, or both can be adjusted dynamically to maintain optimal processing efficiency. Such scalability makes the system adaptable to varying loads and suitable for large-scale deployments. By performing batching, account settings module 112 can manage high-volume data streams more efficiently and reliably. Account settings module 112 may reduce processing strain, optimize resource use, and ensure responsiveness even under heavy load conditions. Though described with respect to batching account settings by account settings module 112, various other modules (e.g., modules 111, 114, 116, 118) of operations computing system 110 may perform batching of one or more units of data from respective data streams according to a time interval, batch size limit, or the like prior to outputting units of data to respective output data streams.

In some examples, account settings module 112 may facilitate efficient maintenance window scheduling, such as by shifting one or more workloads from runtime to configuration time. In some systems, whether a maintenance window was active was computed in real time, as data for a service arrived and processing decisions were being made. Such real time dependency introduces overhead and complexity during alert processing. In contrast, account settings module 112 may determine an active maintenance window at configuration time rather than in real time. For example, when customers update account settings identifying maintenance windows, these account settings are persisted (e.g., stored) by account settings module 112. For instance, account settings module 112 may store localized state information or other information identifying one or more maintenance windows, such as to a storage device. In this manner, account settings module 112 may optimize system performance by eliminating runtime maintenance window checks, ensuring that services are accurately marked under maintenance when needed and streamlining the alert processing pipeline.

Account settings module 112 may track the status of each maintenance window (e.g., active, inactive), allowing account settings module 112 to determine whether any window is active for a service of monitored systems 103 at any given moment. As such, account settings module 112 is efficient even when multiple overlapping maintenance windows exist. For example, account settings module 112 may include one or more of service functions 115 capable of sending delayed messages to itself, such as in the form of a "self-callback." The "self-callback" serves as a powerful mechanism for recalculating and adjusting maintenance window statuses precisely when needed, without impacting real time alert processing. For instance, a service function of service functions 115 may use a "self-callback" to repeatedly (e.g., periodically) call itself to recalculate maintenance window status and persist (e.g., store) updated maintenance window statuses. A service function of service functions 115, by using a self-callback, may be inherently stateful.

By efficiently scheduling maintenance windows, account settings module 112 may reduce runtime overhead. For example, by shifting maintenance window status (e.g., active, inactive) checks to configuration time, account settings module 112 removes the need for real time computations during event and/or alert processing, reducing processing overhead and allowing alerts to be handled faster. With maintenance windows precomputed and managed within account settings module 112, operations computing system 110, such as at modules 111, 112, 114, 116, 118, experiences less load, leading to more efficient system operation and better resource utilization. The use of service functions 115 with delayed messaging (e.g., "self-callbacks") allows account settings module 112 to handle a high volume of maintenance window configurations and changes (e.g., account settings changes) without impacting event and/or alert processing performance, making it suitable for large-scale deployments. With maintenance windows precomputed and actively managed by account settings module 112, troubleshooting is simplified. For example, maintenance status issues can be traced back to account settings data rather than runtime computations, making it faster and easier to identify and resolve any discrepancies. Such clear separation improves transparency and accelerates diagnostics.

Alert processing module 114 may manage alert processing (e.g., alert generation, transformation, grouping). For example, alert processing module 114 may transform events from events data stream 121B into one or more alert sets, and manage their lifecycle based on incoming account settings, user actions, or both. An alert set may include one or more alerts. For example, alert processing module 114 may process units of events data (e.g., incoming events) from events data stream 121B to generate one or more alerts.

Alert processing module 114 may assign (e.g., aggregate, group) the one or more alerts into one or more alert sets. Alert processing module 114 may assign an alert to an alert set based on transformation information, such as when one or more characteristics of the alert satisfy one or more criteria of the transformation information for the alert set. For example, alert processing module 114 may assign alerts generated for the repeated occurrence of the same or similar events (e.g., high latency) to the same alert set, such as for deduplication and/or categorization purposes. Alert processing module 114 may output one or more units of alerts data including indications of one or more alert sets to alerts data stream 124.

Alert processing module 114 may manage the creation, updating, and resolution of individual alerts and maintain (e.g., store) a record of their state (e.g., transmitted (to a user), acknowledged, resolved) throughout the lifecycle of an alert. In some examples, the lifecycle of an alert that includes one or more alerts may represent the state of the alert from creation, transmission (e.g., transmission to users via respective notifications), acknowledgment (e.g., acknowledgement by users), modification, and through to resolution. Alerts may change state for various reasons. For example, an alert may change state based on incoming events that trigger updates to the alert, asynchronous user actions through web or other user interfaces or available APIs, or the like. Alert processing module 114 may perform lifecycle management by creating, updating, and resolving alert sets. Lifecycle management may include creating and updating alert sets based on incoming events, assigning (e.g., aggregating, grouping) individual alerts into respective alert sets for more efficient handling and streamlined resolution, and managing state changes of alert sets caused by user actions or automated workflows, or various subsets thereof. For example, an alert set of one or more alerts may be handled (e.g., transmitted, resolved) as a group. Each alert set may be or represent one or a plurality of alerts and, as such, operations, functionality, or other aspects of individual alerts may be performed or otherwise applied to an alert set and vice versa. With a consistent approach to lifecycle management for alerts and alert sets, alert processing module 114 may efficiently handle large volumes of events, ensuring smooth, responsive operation at operations computing system 110.

Alert processing module 114 may generate an alert for one or more services at respective monitored systems 103 based on events from events data stream 121B. In some examples, alert processing module 114 may apply one or more machine learning models that implement a clustering algorithm and/or one or more heuristics to determine an alert context. For example, alert processing module 114 may determine an alert context for an alert based on a summary included in the alert. For instance, alert processing module 114 may generate a token for each word included in a summary of the alert. Alert processing module 114 may assign a weight to each generated token and determine the alert context as values corresponding to weights assigned to the tokens. The alert context may include one or more data structures (e.g., a vector including weight values, a string summarizing an alert, etc.) defining characteristics of an alert. In some examples, the alert context may include one or more data structures defining characteristics of an alert, such as a timestamp when an alert was triggered or user feedback associated with an alert (e.g., a string, boolean, or integer indicating an accuracy of the alert context, merging or unmerging alerts, moving alerts, bulk acknowledgement or resolution of alerts, etc.).

Alert processing module 114 may add alerts to respective alert sets based on alert contexts. For example, alert processing module 114 may add an alert to an alert set by comparing values of an alert context corresponding to the alert and values of saved alert group contexts. An alert set context may include one or more data structures defining a compilation or normalization of alert contexts included in an alert set. Alert processing module 114 may determine whether the weight values associated with the alert satisfy a threshold similarity when compared to weight values of the alert set. Alert processing module 114 may add an alert to an alert set based on values of the alert context corresponding to the alert. For example, alert processing module 114 may add an alert to a particular alert set based when the alert context of the alert is closest to values of the alert set context corresponding to the alert set as compared to alert set contexts of other alert sets.

Incident mapping module 116 may map (e.g., assign) alerts or alert sets into incidents. For example, incident mapping module 116 may determine an incident for a service of monitored systems 103 based on alert sets published to alerts data stream 124 by alert processing module 114. For instance, incident mapping module 116 may assign one or more alerts (e.g., alert set) to an incident when the one or more alerts indicates a disruption to the service that should be reported to a user (e.g., on-call responder). As described above, alert processing module 114 may assign (e.g., group) one or more alerts into one or more alert sets. Incident mapping module 116 may cause incident interface module 119 to send a notification to a user (e.g., on-call responder).

As can be seen, incident mapping module 116 may represent a bridge between alert processing domains (e.g., alert processing module 114, alert repository module 118) and incident management domains (e.g., incident interface module 119). For example, incident mapping module 116 may tailor (e.g., transform, format) units of alerts data from alerts data stream 124 of alert processing module 114 to suit the needs of alert repository module 118, incident interface module 119, or both. In this manner, incident mapping module 116 allows alert processing module 114 to focus on its core functionality. Incident mapping module 116 may map alerts or alert sets to incidents using mapping information from account settings data stream 122B. For example, the mapping information may include one or more criteria indicating an incident to which alerts or alert sets with particular characteristics should be assigned. For instance, incident mapping module 116 may assign an alert or alert set to an incident when one or more characteristics of the alert or alert set satisfy one or more criteria of the mapping information for the incident. Alert repository module 118 may receive an indication of the incident to which respective alerts or alert sets are assigned and store such indications, such as to a storage device, as alert information.

Incident mapping module 116 may implement a translation layer to standardize and facilitate communication between different domains (e.g., alert processing domain, incident management domain), such as to enable seamless interoperability and resolve compatibility challenges between domains. Incident mapping module 116, or a different mapping or other module of operations computing system 110, may support custom mappings to other domains, such as domains of third parties. For example, incident mapping module 116 may receive mapping rules from third parties that, when executed by incident mapping module 116, map events according to criteria of such third parties. Incident mapping module 116 may perform stateful processing to ensure accurate and consistent mappings.

In some examples, incident mapping module 116 may orchestrate various actions related to analyzing operations events. For example, incident mapping module 116 may notify a user of an event. Incident mapping module 116 may perform actions related to mapping (e.g., classifying) actions or action sets from actions data stream 124 based on severity (e.g., critical, error, warning, information, unknown, etc.). Incident mapping module 116 may determine an urgency (e.g., time frame) for addressing an incident and cause incident interface module 119 to include the urgency in a notification. Incident mapping module 116 may cause incident interface module 119 to send notifications to relevant users and/or computing systems/devices, such as based on account settings from account settings data stream 122B.

Alert repository module 118 may receive alert updates data stream 126 and store alert information determined from alert updates data stream 126, such as to a storage device of operations computing system 110. Alert repository module 118 may be configured to record details related to the status of events received by operations computing system 110 in the form of alert information. For example, alert repository module 118 may store, in the alert information, lifecycle metrics, statuses, or other information associated with alerts and/or alert sets and incidents (e.g., creation time, acknowledgement time(s), resolution time, etc.), user actions related to resolving the events (e.g., user actions from on-call responders), and the like. Alert repository module 118 may store the alert information in various formats, including various structured data formats (e.g., databases).

To perform their respective functions, modules (e.g., modules 111, 112, 114, 116, 118, 119) of operations computing system 110 may include and execute one or more service functions 115. Though illustrated in the example of FIG. 1 as individual blocks, each of service functions 115A-115N may represent one or more service functions. As can be seen, event processing module 111 may include service functions 115A, account settings module 112 may include service functions 115B, alert processing module 114 may include service functions 115C, incident mapping module 116 may include service functions 115D, alert repository module 118 may include service functions 115N. In some examples, service functions 115 may be hosted locally at operations computing system 110 or remotely, such as on a remote server, cloud server, or other remote computing system or computing device. Service functions 115 may represent one or more functions that are executed to support operations of operations computing system 110. For example, service functions 115 may include application functions, API functions, function as a service (FaaS) functions, containerized functions, or the like that may be executed, locally or remotely, by modules (e.g., modules 111, 112, 114, 116, 118, 119), data streams (e.g., data streams 121, 122, 124, 126), or other elements of operations computing system 110 to provide the functionality described herein.

In operation, a service function of service functions 115 may process one or more units of data from a data stream. For example, one or more of service functions 115C corresponding to alert processing module 114 may process units of events data from events data stream 121B, units of account settings data from account settings data stream 122B, or both to output one or more units of alerts data to alerts data stream 124. For instance, the data stream service of events data stream 121B may execute a first service function of service functions 115C using a unit of events data as input to the first service function. Similarly, the data stream service of account settings data stream 122B may execute a second service function of service functions 115C using a unit of account settings data as input to the second service function. In this example, the first service function may process the event corresponding to the unit of events data received as input by the first service function. The first service function may process the unit of events data according to account settings corresponding to the unit of account settings data received by the second service function. For example, the account settings may include criteria for assigning alerts to one of a plurality of alert sets (e.g., criteria for establishing and/or differentiating individual alert sets). For instance, the first or another service function of service functions 115C may generate one or more alerts based on the unit of events data. The first service function may assign the alert to an alert set of a plurality of alert sets based on the criteria from the account settings.

A service function of service functions 115 may also or alternatively, process data from other service functions of service functions 115. As such, a service function of service functions 115 may invoke another service function of service functions 115. Continuing the above example for instance, a third service function of service functions 115C may receive an indication of the alert set to which the alert is assigned, an indication of the alert, or both from the first service function. The third service function may output one or more units of alerts data to alerts data stream 124. In this example, the first service function may invoke the third service function with the indication of alert set to which the alert is assigned, the indication of the alert, or both as input to the third service function. Though described with respect to service functions 115C, service functions 115A, 115B, 115D, 115N may be invoked by other service functions 115, by data stream services, or both.

Operations computing system 110 may pass tracked metadata across a chain of one or more invocations of service functions 115, such as to ensure consistency and track data flow as events from monitored systems 103 propagate through a graph (e.g., sequence) of service function 115 invocations in the form of the various units of data and data streams as described above. For example, an event from a monitored system of monitored systems 103 may result in units of data relating to the event being generated at one or more of events data streams 121, alerts data stream 124, and alert updates data stream 126 by respective service functions 115 of event processing module 111, alert processing module 114, and incident mapping module 116. As such, as the event is propagated through the service functions 115, the event may result in one or more units of events data representing the event at events data stream 121B, one or more units of alerts data representing an alert or alert set generated based on the event at alerts data stream 124, and one or more units of alert updates data representing changes to alert information for the alert or alert set at alert updates data stream 126.

Service functions 115 may receive and pass tracked metadata, such as in a message, as each service function is invoked. In some examples, the tracked metadata may include an offset or other identifier suitable to identify one or more units of data within a corresponding data stream, an indication of the corresponding data stream, and/or other suitable metadata. For instance, an offset n may indicate that a unit of data is at offset n or the nth position within the data stream containing the unit of data. The tracked metadata may also include an indication of the event (from one or more of monitored systems 103) being processed, an indication of the service function being invoked (e.g., name of the service function), exceptions or other errors that occurred during the invocation of the service function, input and/or output received and/or generated by the service function, timestamps (e.g., the invocation time of the service function), or the like. In some examples, one or more of service functions 115 may store the tracked metadata, such as to generate a log of tracked metadata.

To illustrate with respect to the above example, the data stream service of events data stream 121B may invoke the first service function with the offset, within events data stream 121B, of the one or more units of events data the data stream service provides to the first service function as input. When the first service function invokes the third service function, the first service function may pass tracked metadata including at least the offset to the third service function. The third service function may include the tracked metadata in one or more units of data outputted by alert processing module 114 to alerts data stream 124. For example, the third service function may include the tracked metadata in one or more units of alerts data outputted to alerts data stream 124.

Continuing this example, one or more service functions of service functions 115D, one or more service functions of service functions 115N, or both may continue to pass the tracked metadata between service functions, within units of data of respective data streams, or both. For example, a service function of service functions 115D of incident mapping module 116 may receive the tracked metadata from the one or more units of alerts data from alerts data stream 124 and include the tracked metadata in one or more units of alert updates data incident interface module outputs to alert updates data stream 126. A service function of service functions 115N may receive the tracked metadata from the one or more units of alert updates data from alert updates data stream 126 and store the tracked metadata, such as within the alert information stored by alert repository module 118. Client devices 106, operations computing system 110, or both may query the tracked metadata such as for tracing and debugging purposes.

Through tracked metadata, operations computing system 110 enhances data reliability and traceability, which is essential for preserving the integrity of operations computing system 110. In some examples, at least one of service functions 115 at one or more of event processing module 111, account settings module 112, alert processing module 114, incident mapping module 116, or alert repository module 118, when invoked, may store tracking metadata such as to form a log. Client devices 106, operations computing system 110, or both may query the log to trace errors, bugs, or other anomalies.

As can be seen, the tracked metadata may remain attached to an event as units of data related to the event propagate through a graph of service functions 115, allowing every step of each event's lifecycle to be logged for monitoring and troubleshooting purposes. By tracking each event's tracked metadata from ingestion to processing and final output, operations computing system 110 provides comprehensive traceability across the entire lifecycle of the event. For example, operations computing system 110 may use the tracked metadata to help identify data loss and duplication and validate that every event is processed exactly once, without overlap or omission. For instance, to identify data loss for an event (e.g., the event was not properly processed), operations computing system 110 may determine whether tracked metadata for the event has not been logged by one or more of event processing module 111, account settings module 112, alert processing module 114, incident mapping module 116, or alert repository module 118 or whether the tracked metadata indicates an error occurred for the event. To validate whether an event is processed exactly once, operations computing system 110 may determine whether any duplicate tracked metadata has been logged.

Through logging (e.g., storage) of tracked metadata, operations computing system 110 also provides clear insight into each event's path through multiple service functions 115. Such log may provide a precise record of processed offsets and pending (e.g., unprocessed) offsets, thereby allowing operations computing system 110 to identify the source of any issue or anomaly in a straightforward manner. For example, processed offsets may be present within tracked metadata logged by operations computing system 110 while pending offsets may not be present in such tracked metadata. Such transparency accelerates debugging (e.g., problem diagnosis and resolution), strengthening the overall resilience of operations computing system 110.

The tracked metadata also provides improved visibility into the operation of operations computing system 110 by enabling real-time tracking of data flow through service functions 115. For example, operations computing system 110 may monitor offset recorded in the tracked metadata, to gain insights into event processing performance and behavior at modules 111, 112, 114, 116, 118, such as to identify elements (e.g., service functions 115, data streams) that may be fine-tuned to address bottlenecks, and boost efficiency of operations computing system 110.

Service functions 115 may be stateful or stateless. For example, service functions 115 may maintain or otherwise utilize localized state information (e.g., be stateful). For instance, a module (e.g., module 111, 112, 114, 116, 118, 119) may store localized state information indicating whether an instance of a service function of service functions 115 is currently executing or not. The instance of the service function may correspond to an instance of the service function that was invoked with particular input parameters. The module, the service function, or both may use the localized state information during operation. For example, the service, the function, or both may use the localized state information to ensure idempotency such as by preventing multiple instances of the service function invoked with the same input parameters from being executed.

The techniques described herein may provide one or more technical advantages that realize one or more practical applications. For example, rather than processing events from monitored systems 103 using a monolithic architecture where events are processed synchronously and sequentially through a sequence of operations (e.g., functions) from beginning to end, where each operation is dependent upon and therefore must wait for completion of the previous operation, operations computing system 110 may asynchronously process events through one or more modules (e.g., modules 111, 112, 114, 116, 118, 119). As described above, respective modules (e.g., modules 111, 112, 114, 116, 118, 119) of operations computing system 110 may perform one or more different tasks as compared to other modules of operations computing system 110. For example, as described above, event processing module 111, account settings module 112, alert processing module 114, incident mapping module 116, and alert repository module 118 may each perform different tasks. In accordance with the techniques herein, rather than performing such tasks in synchronously or in sequence, such as in a monolithic architecture, event processing module 111, account settings module 112, alert processing module 114, incident mapping module 116, and alert repository module 118 may perform their respective tasks asynchronously (e.g., independently). For example, rather than waiting for alert processing module 114 before processing another event, event processing module 111 may continuously process events received from monitored systems 103 and thereby continuously output units of events data to events data stream 121B. As another example, account settings module 112 may continuously process account settings from repository systems 105 and thereby continuously output units of account settings data to account settings data stream 122B without waiting for alert processing module 114.

Alert processing module 114 may continuously process units of data from events data stream 121B, account settings data stream 122B, or both. In this manner, alert processing module 114 may continuously output units of alerts data to alerts data stream 124. Incident mapping module 116 may continuously process units of alerts data from alerts data stream 124 and continuously output units of alert updates data to alert updates data stream 126. Incident mapping module 116 may transmit notifications to users at client devices 106 through incident interface module 119 based on mapping operations, such as mapping operations performed during processing the units of alerts data from alerts data stream 124. As can be seen, each of event processing module 111, account settings module 112, alert processing module 114, incident mapping module 116, and alert repository module 118 may asynchronously (e.g., independently) perform operations (e.g., process data streams) on their respective data streams independent of other modules. In this manner, operations computing system 110 may asynchronously process events from monitored systems 103. By asynchronously processing events, operations computing system 110 distributes processing tasks which more efficiently processes events allowing a larger number of events to be processed using the same computing resources (e.g., processing, memory, network resources). Accordingly, by asynchronously processing events, operations computing system 110 reduces the consumption of computing resources to process a given number of events (e.g., 100,000 events) as compared to monolithic architectures.

A monolithic system that processes events synchronously, such as those described above, may represent a strongly consistent system in that such systems invoke a sequence of operations to process each received event where data corresponding to the event remains stateful throughout the sequence of operations. For example, the data corresponding to the event may remain consistent with a global state (e.g., a single source of truth) and may be used (e.g., accessed) across the sequence of operations. In contrast, operations computing system 110 may represent an eventually consistent system in that data corresponding to a received event may become stateful (e.g., consistent) when the event is processed by operations computing system 110 (e.g., fully propagates through modules (e.g., modules 111, 112, 114, 116, 118, 119 and/or service functions thereof), and prior to the data being fully propagated, the data may be stateless or otherwise not be consistent with a global state (e.g., a single source of truth) across operations computing system 110 (e.g., be inconsistent across data streams 121, 122, 124, 126 or other elements of operations computing system 110). One or more of modules 111, 112, 114, 116, 118, 119 and/or data streams 121, 122, 124, 126 of operations computing system 110 may be considered stateless in that these elements operate independent of a global state (e.g., a single source of truth) for the data handled by these elements.

For example, alerts data stream 124 may include updated alert information that is different from the alert information corresponding to alert updates data stream 126 until the updated alert information is propagated to (e.g., processed by incident mapping module 116) alert updates data stream 126. As another example, account settings data stream 122A may include updated account settings that are different than account settings from account settings data stream 122B until the updated account settings propagate to (e.g., are processed by account settings module 112) account settings data stream 122B. Since the modules (e.g., modules 111, 112, 114, 116, 118, 119) of operations computing system 110 operate asynchronously, the modules may process units of data for other events before the received event is fully propagated through the modules.

Figure 2:
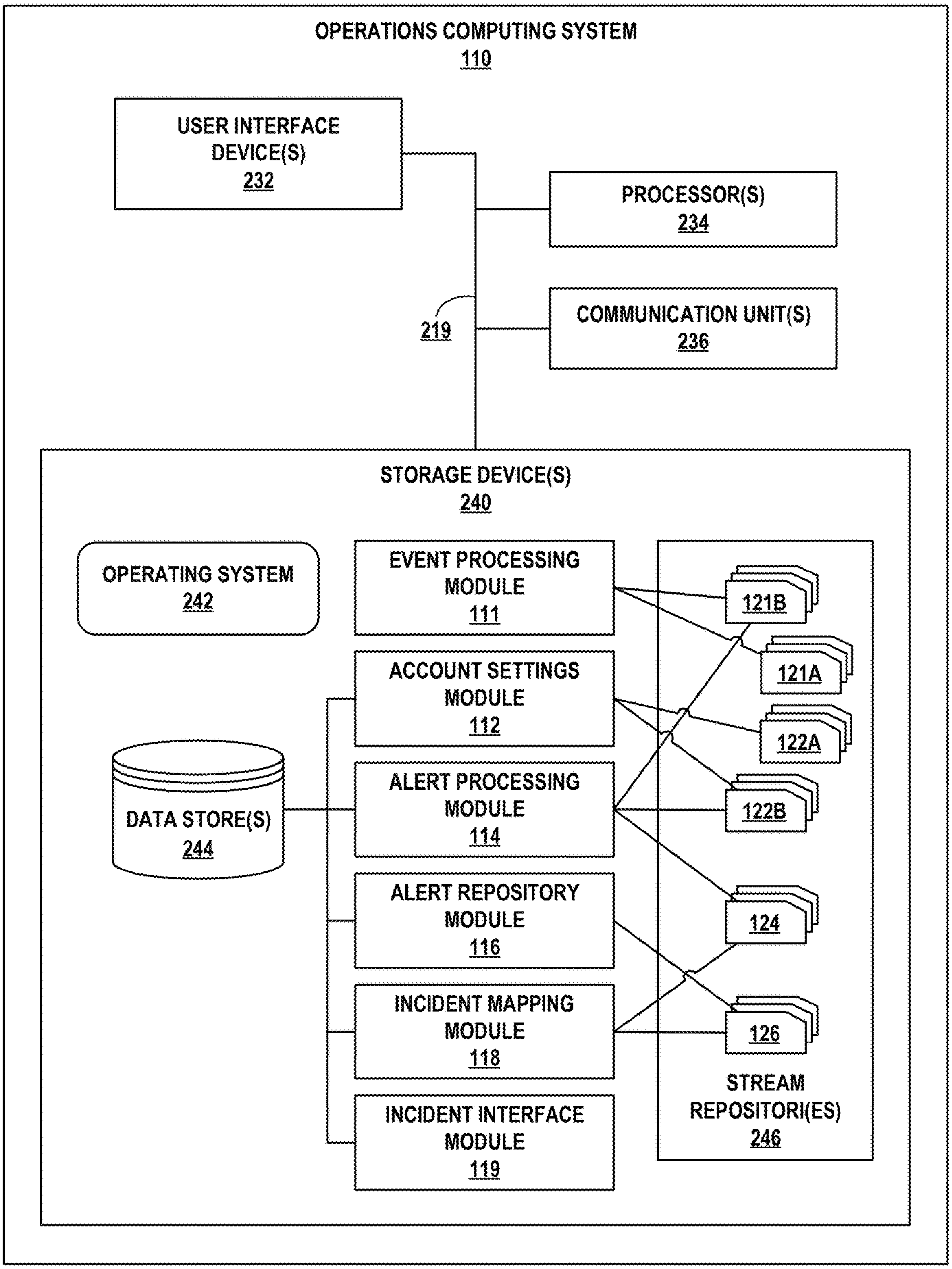
FIG. 2 is a block diagram illustrating an example computing system for asynchronous incident response actions, in accordance with the techniques of this disclosure.

FIG. 2 is a block diagram illustrating an example computing system for asynchronous incident response actions, in accordance with the techniques of this disclosure. Operations computing system 110, in the example of FIG. 2, may be an example of operations computing system 110 of FIG. 1. Operations computing system 110 may include any suitable computing system, including one or more server or other computers, mainframes, appliances, cloud computing systems and/or other computing systems or devices capable of performing the functions described herein. Operations computing system 110 may, in some examples, represent a server or other computer cluster, cloud computing system, or other combination of computing systems or devices capable of performing the functions described herein. Operations computing system 110 may be implemented through one or more virtualized computing systems or devices (e.g., virtual machines, containers) of a server or other computer, cloud computing service, or other computing system or device.

As can be seen from the example of FIG. 2, operations computing system 110 may include one or more UI devices 232, one or more processors 234, one or more communication units 236, and one or more storage devices 240, or various subsets thereof. Communication channels 219 may interconnect each of components 232, 234, 236, and 240 for inter-component communications (physically, communicatively, and/or operatively). In some examples, communication channel 219 may include a system bus, a network connection, an inter-process communication data structure, or any other component for communicating data.

UI devices 232 may be configured to function as an input device and/or an output device for operations computing system 110. UI device 232 may be implemented using various technologies. For instance, UI device 232 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command or other input from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 232 may include a presence-sensitive device that may receive tactile input from a user of operations computing system 110.

UI device 232 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, mini LED, micro LED, organic light-emitting diode (OLED) display, e-ink, or similar monochrome or color display capable of outputting visible information to a user of operations computing system 110. Additional examples of an output device include a speaker, a haptic device, or other device that can generate intelligible output to a user. For instance, UI device 232 may present output as a graphical user interface that may be associated with functionality provided by operations computing system 110.

Processor 234 may implement functionality and/or execute instructions within operations computing system 110. For example, processor 234 may receive and execute respective instructions of operating system 242, one or more data stores 244, and/or one or more stream repositories 246 to provide the functionality of these elements. As another example, processor 234 may receive and execute respective instructions of event processing module 111, account settings module 112, alert processing module 114, alert repository module 118, incident mapping module 116, and/or incident interface module 119 to provide the functionality of these elements. Similarly, processor 234 may receive and execute respective instructions of one or more events data streams 121, one or more account settings data streams 122, alerts data stream 124, and alert updates data stream 126, including functionality of one or more data stream services thereof, to provide the functionality of these elements.

As described above, processor 234 may execute components of operations computing system 110 such that these components operate independently. For example, processor 234 may execute modules 111, 112, 114, 116, 118, 119 and data streams 121, 122, 124, 126 (e.g., data stream services) asynchronously. In this manner, event processing module 111 may process events data stream 121A to generate one or more units of events data for events data stream 121B independently of account settings module 112 processing account settings data stream 122A to generate one or more units of account settings data for account settings data stream 122B and alert processing module 114 processing events data stream 121B, accounts settings data stream 122B, or both to generate one or more units of account sets data for account sets data stream 124, for example. Similarly, incident interface module 119 may independently process account sets data stream 124 to generate one or more units of account updates data for account updates data stream 126.

The instructions executed by processors 234 may cause operations computing system 110 to store and/or modify information within storage device 240 or processor 234 during program execution. Storage device 240 may store information for processing during operation of operations computing system 110 (e.g., operations computing system 110 may store data streams 121, 124, 126 and other data during execution). In some examples, storage device 240 may be a temporary memory, meaning that a primary purpose of storage device 240 is not long-term storage. Storage device 240 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage device 240 may include one or more computer-readable storage media. Storage devices 240 may be configured to store larger amounts of information than volatile memory. Storage device 240 may further be configured for long-term storage of information as non-volatile memory space and retain information after power on/off cycles. Examples of non-volatile memories include magnetic discs, optical discs, flash memories, or forms of electrically programmable memories (EPROM) or electrically erasable and programmable (EEPROM) memories. Storage device 240 may store program instructions and/or information (e.g., within data stores 244) used (e.g., accessed, generated, modified, processed) by modules 111, 112, 114, 116, 118, 119, and data streams 121, 122, 124, 126, or various subsets thereof.

Storage device 240 may include one or more stream repositories 246 that store data streams 121, 122, 124, 126. For example, stream repositories 246 may store data streams 121, 122, 124, 126 in a structured or unstructured data format suitable for persisting units of data of data streams 121, 122, 124, 126 in a reliable fashion. Examples of stream repositories 246 include databases, text files, binary files, and the like. Each of data streams 121, 122, 124, 126 may be stored to a different stream repository of stream repositories 246, or one or more of data streams 121, 122, 124, 126 may be stored to a common stream repository of stream repositories 246.

Storage device 240 may include one or more data stores 244 that store data used by (e.g., accessed, generated, modified, processed) by modules 111, 112, 114, 116, 118, 119. For example, data stores 244 may store tracked metadata, localized state information, or other data for use by modules 111, 112, 114, 116, 118, 119. Each of modules 111, 112, 114, 116, 118, 119 may use a different data store of data stores 244 to store its respective tracked metadata, localized state information, or other data, or one or more of modules 111, 112, 114, 116, 118, 119 may use a common data store of data stores 244 to store tracked metadata, localized state information, or other data.

Communication unit 236 may communicate with one or more external devices via one or more wired and/or wireless networks by transmitting and/or receiving network signals on the one or more networks. For example, communication unit 236 may receive indications of events from monitored system 103 of FIG. 1, account settings from repository systems 105 of FIG. 1, or both. Examples of communication units 236 include a network interface card (e.g., such as an Ethernet card), an optical transceiver, a radio frequency transceiver (e.g., WI-FI, BLUETOOTH, cellular radio), a global navigation satellite system (GNSS) receiver, or any other type of device that can send and/or receive information. Other examples of communication unit 236 may include short wave radios, data radios (for terrestrial and/or satellite cellular networks), as well as universal serial bus (USB) controllers.

Operating system 242 may provide an execution environment for components (e.g., data stores 244, stream repositories 246, modules 111, 112, 114, 116, 118, 119, data streams 121, 122, 124, 126) of operations computing system and/or control the operation of components of operations computing system 110. For example, operating system 242 may facilitate the communication between modules 111, 112, 114, 116, 118, 119, data streams 121, 122, 124, 126 with processors 234, storage devices 240, and communication units 236. Operating system 242 may have a kernel that facilitates interactions with underlying hardware of operations computing system 110 and provides a fully formed application space capable of executing a wide variety of software applications having secure partitions in which each of the software applications executes to perform various operations.

Figure 3:
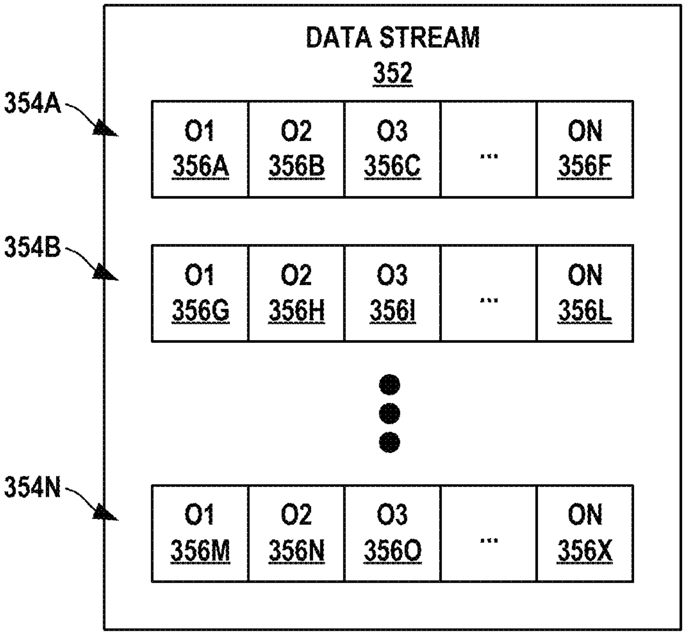
FIG. 3 is a block diagram illustrating an example data stream, in accordance with the techniques of this disclosure.

FIG. 3 is a block diagram illustrating an example data stream 352, in accordance with the techniques of this disclosure. Aspects of FIG. 3 are described below in the context of FIGS. 1-2. Data stream 352 may be an example of one or more of data streams described herein (e.g., data streams 121, 122, 124, 126). Data stream 352 may include one or more units of data 356A-356X (collectively, "units of data 356"). Units of data 356 may represent portions of data in one or more of data streams 121, 122, 124, 126. For example, one or more of units of data 356 may represent units of events data of one or more of events data streams 121, units of account settings data of one or more of account settings data streams 122, units of account sets data of account sets data stream 124, and/or units of account updates data of account updates data stream 126.

Data stream 352 may include an identifier suitable for identifying data stream 352 from a plurality of data streams, such as a plurality of data streams that are commonly stored or otherwise hosted by operations computing system 110. For example, data stream 352 may include a name, which may describe a topic or other identifier (e.g., "events," "alerts," "alert updates") for units of data 356 within data stream 352. Modules 111, 112, 114, 116, 118, 119, may access a particular data stream of a plurality of data streams (e.g., data streams 121, 122, 124, 126) using the identifier of the data stream.

As described above, units of data 356 may be stored in a sequence. As shown in the example of FIG. 3 for instance, unit of data 356A may occupy a first offset (e.g., position) 01 within data stream 352, unit of data 356B may occupy a second offset O2 within data stream 352, unit of data 356C may occupy a third offset O3 within the data stream, and so on and so forth. A combination of these offsets may represent an ordered sequence, such as where the first offset may be positioned before the second offset, the second offset may be positioned before the third offset, the third offset may be positioned before a fourth offset, and so on and so forth. A module of modules 111, 112, 114, 116, 118, 119, such as through service functions 115 thereof, may write to data stream 352 by appending one or more units of data to the end of a sequence of units of data 356.

In operation, a module of modules 111, 112, 114, 116, 118, 119, such as through service functions 115 thereof, may access (e.g., read) one or more units of data from units of data 356 from data stream 352 using the offset or offsets of these one or more units of data. For example, a service function of service functions 115 may locate unit of data 356C within data stream 352 using the offset of unit of data 356C, in this example offset O3, of unit of data 356C. The service function may then read or otherwise obtain unit of data 356C at offset O3. The service function may use include and/or pass an indication of the offset (e.g., O3), the data stream identifier (e.g., topic), or both in tracked metadata, such as for the logging, monitoring, tracing, or other tracking purposes described above.

In some examples, units of data 356 may be assigned to one or more partitions 354A-354N (collectively, "partitions 354"). Each of partitions 354 may represent a separate sequence (e.g., an ordered set) of units of data 356. A module of modules 111, 112, 114, 116, 118, 119 may concurrently update multiple units of data 356, such as by concurrently writing units of data 356 to multiple partitions 354 of data stream 352. In some examples, service functions 115 of modules 111, 112, 114, 116, 118, 119 may be assigned to one or more of partitions 354. For instance, in a module of modules 111, 112, 114, 116, 118, 119, a first service function of service functions 115 may write to a partition assigned thereto, such as partition 354A, and a second service function of service functions 115 may write to a partition assigned to the second service function, such as partition 354B. Continuing the above example, the service function of service functions 115 may include an indication of the partition in tracked metadata. As such, the service function may receive and/or pass tracked metadata including the offset, the data stream identifier, and/or the partition, such as for the logging, monitoring, tracing, or other tracking purposes described above.

Figure 4:
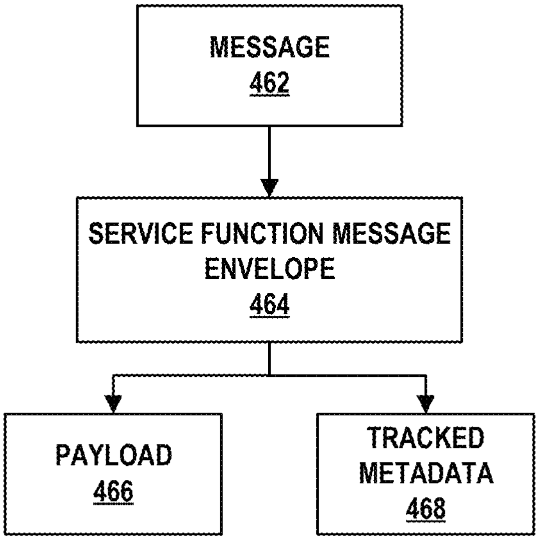
FIG. 4 is a block diagram illustrating an example message, in accordance with the techniques of this disclosure.

FIG. 4 is a block diagram illustrating an example message 462, in accordance with the techniques of this disclosure. Aspects of FIG. 4 are described below in the context of FIGS. 1-2. For example, message 462 may be an example of a message passed to a service function of service functions 115 to invoke execution of the service function. For instance, message 462 may represent function parameters or other input to the service function. Message 462 may be provided to the service function by another service function of service functions 115, a data stream service, one or more of modules 111, 112, 114, 116, 118, 119, or another element of operations computing system 110, such as part of the invocation of the service function. Message 462 may be an example of various network or other communication packets. For instance, message 462 may represent a custom communication packet generated for the APACHE FLINK Stateful Functions framework.

As can be seen from the example of FIG. 4, message 462 may include service function message envelope 464 which may function as a container or wrapper for other data. For instance, service function message envelope 464 may include payload 466, tracked metadata 468, or both. Payload 466 may represent function parameters provided to a service function of service functions 115 to invoke the service function. For example, payload 466 may include data from a data stream (e.g., data streams 121, 122, 124, 126) corresponding to the expected parameters for a service function of service functions 115. Tracked metadata 468 may be an example of the tracked metadata described above and, as such, may include one or more indications of one or more offsets, one or more data stream identifiers, one or more partitions, an identifier of one or more corresponding service function (e.g., the name of the invoking and/or invoked service function), or other metadata.

Figure 5:
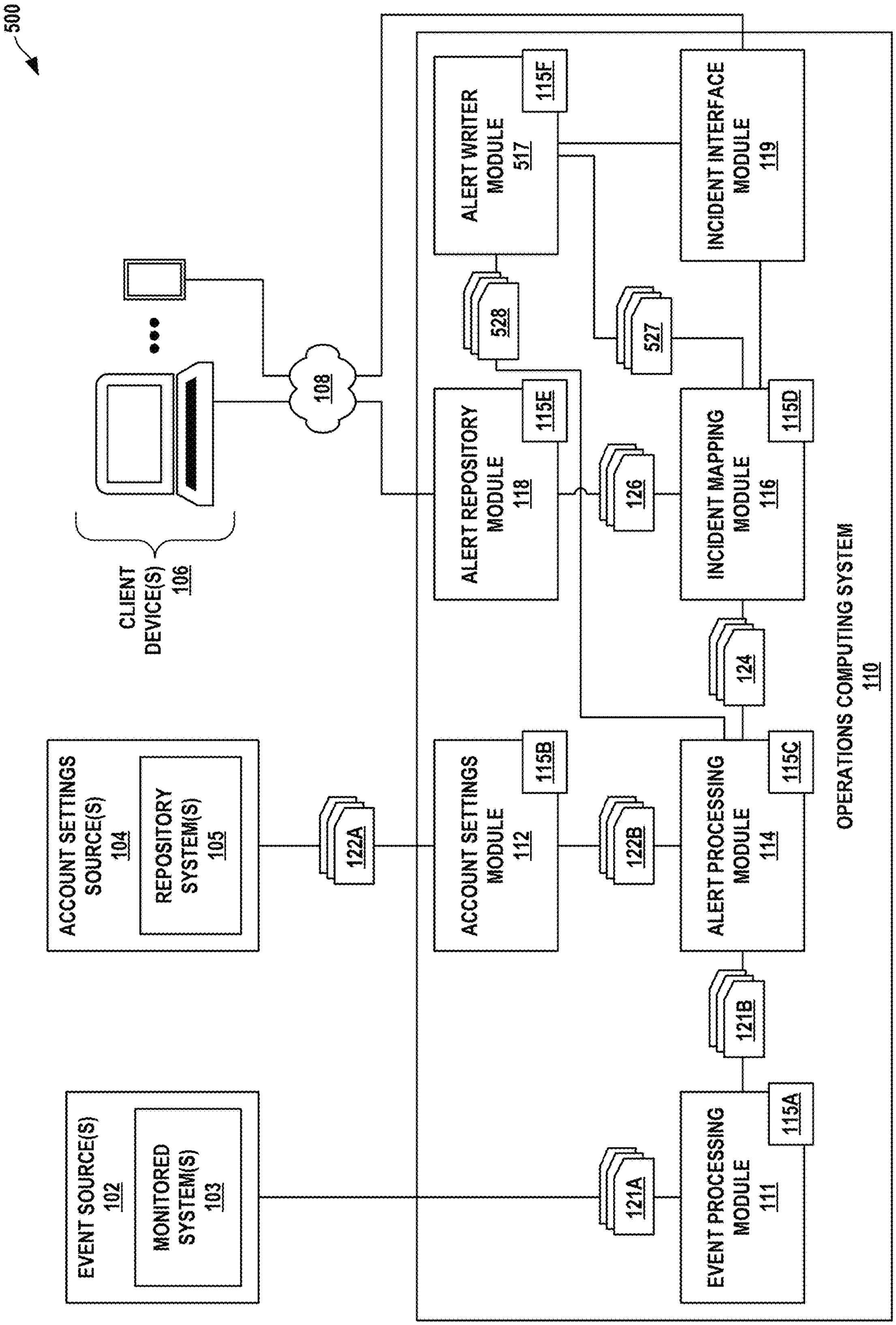
FIG. 5 is a block diagram illustrating a second example of a system for asynchronous incident response actions, in accordance with the techniques of this disclosure.

FIG. 5 is a block diagram illustrating a second example of a system 500 for asynchronous incident response actions, in accordance with the techniques of this disclosure. Aspects of FIG. 5 may be described in the context of FIGS. 1-3. For example, system 500 and operations computing system 110 of FIG. 5 may respectively be examples of system 100 and operations computing system 110 of FIG. 1. Similarly, event sources 102, account settings sources 104, client devices 106, and network 108 of FIG. 5 may respectively be examples of event sources 102, account settings sources 104, client devices 106, and network 108 of FIG. 1. User actions data stream 527 and alert processing data stream 528 may both be examples of data stream 352 of FIG. 3. User actions data stream 527 may be generated through user actions on incidents (which may transitively affect alerts), while alert processing data stream 528 may be generated through user actions on alerts. In some examples, alert processing states can be modified by either of these data streams 527, 528, independent of event processing stream 121B.

As can be seen from the example of FIG. 5, operations computing system 110 may include alert writer module 517. Similar to modules 111, 112, 114, 116, 118, 119, alert writer module 517 may be stored to storage device 240 and include instructions that may be executed by processor 234 to provide the functionality of alert writer module 517. For example, alert writer module 517 may include and/or execute one or more service functions 115F using processor 234.

In operation, alert writer module 517 may receive user actions from users through client devices 106, such as to allow users to perform various user actions at operations computing system 110, such as to manage (e.g., create, update, resolve) incidents, alerts, or both. As can be seen from the example of FIG. 5, client devices 106 may send user actions to incident interface module 119 and alert writer module 517 may receive the user actions from incident interface module 119. Some example user actions include moving (e.g., assigning) an alert to a different parent incident, updating an alert (e.g., moving or resolving the alert), merging incidents (e.g., moving alerts from a source incident to a target incident and resolving the source incident), creating incidents, and resolving incidents. As can be seen, alert writer module 517 may allow client devices 106 or other elements of system 500 and/or operations computing system 110, to create incidents, alerts, or both independent of events and event processing module 111.

Alert writer module 517 may process units of data from one or more data streams, generate one or more units of data as output to one or more other data streams. As shown in the example of FIG. 5 for instance, alert writer module 517 may generate one or more units of user actions data, based on user actions received from clients 106, and output the one or more units of user actions data to user actions data stream 527. As shown in the example of FIG. 5, incident mapping module 116 may facilitate processing of user actions, such as in the form of one or more units of user actions data from user actions data stream 527. For example, incident mapping module 116 may route a user action to alert processing module 114. Alert processing module 114 may, for example, assign an alert to a different alert set based on the user action. Incident mapping module 116 may facilitate processing of user actions to assign an alert set (e.g., one or more alerts) to a different parent incident, update an alert, redact (e.g., modify, delete) an alert, merge an incident, create an incident, and resolve an incident, or various subsets thereof according to the user action represented by the one or more units of user actions data from user actions data stream 527. Continuing the above example, incident mapping module 116 may, in turn, receive the updated assignment of the alert by reading alerts data stream 124, and publish an alert update through one or more units of alert updates data published to alert updates data stream 126. Alert repository module 118 may use (e.g., read) one or more units of alert updates data to alert updates data stream 126 to update alert information with the updates based on the user action. For instance, alert repository module 118 may update alert information to indicate the updates to an alert, the merging of an incident, creation of an incident, and the resolution of an incident, or various subsets thereof. As another example, incident mapping module 116 may cause incident interface module 119 to transmit a notification to a particular user or users at client devices 106 in response to the user actions (e.g., creation of an incident). Such notification may include information corresponding to the user action (e.g., incident created, incident merged, incident resolved).

In some examples, in addition to or instead of incident mapping module 116 processing one or more units of user actions data from user actions data stream 527, alert processing module 114 may process one or more units of alert actions data from user actions data stream 527. In these examples, alert processing module 114 may generate one or more units of alerts data and output the one or more units of alerts data to alerts data stream 124. For instance, alert processing module 114 may generate one or more units of alerts data that assigns one or more alerts to an alert set identified in the user action. Alert processing module 114 may generate one or more units of alert processing data and output the one or more units of alert processing data to alert processing data stream 528. One or more units of alert processing data may include an indication that the user action has been processed. For example, the one or more units of alert processing data may indicate that a user action, such as the user action originally received at incident interface module 119, has been processed by operations computing system 110 (e.g., processed by incident mapping module 116, alert processing module 114, or both). Alert writer module 528 may process the one or more units of alert processing data from alert processing data stream 528 and transmit, to incident interface module 119, an indication of the same for the user action. Incident interface module 119 may transmit, to client devices 106, an indication of the result (e.g., acknowledgment of the user action, indication of whether the user action was completed) of the user action. Client devices 106 may present the indication to corresponding users.

As can be seen, similar to modules 111, 112, 114, 116, 118, 119, operations computing system 110 may independently (e.g., asynchronously) execute alert writer module 517 such that alert writer module 517 may continuously receive and process user actions independent of the operation of other modules (e.g., modules 111, 112, 114, 116, 118, 119). Operations computing system 110 may independently execute alert writer module 517 to generate one or more units of data that may be used by other modules (e.g., modules 111, 112, 114, 116, 118, 119. As described above for example, alert writer module 517 may output one or more units of user actions data to user actions data stream 527, one or more units of account processing data to account processing data stream 528 independent of the operation of alert processing module 114, incident mapping module 116, and/or other modules.

Data streams 527, 528 may be examples of data stream 352. As such, data streams 527, 528 may include units of data 356. For example, user actions data stream 527 may include units of data 356 representing one or more units of user actions data. As another example, alert processing data stream 528 may include units of data 356 representing one or more units of alert processing data.

Figure 6:
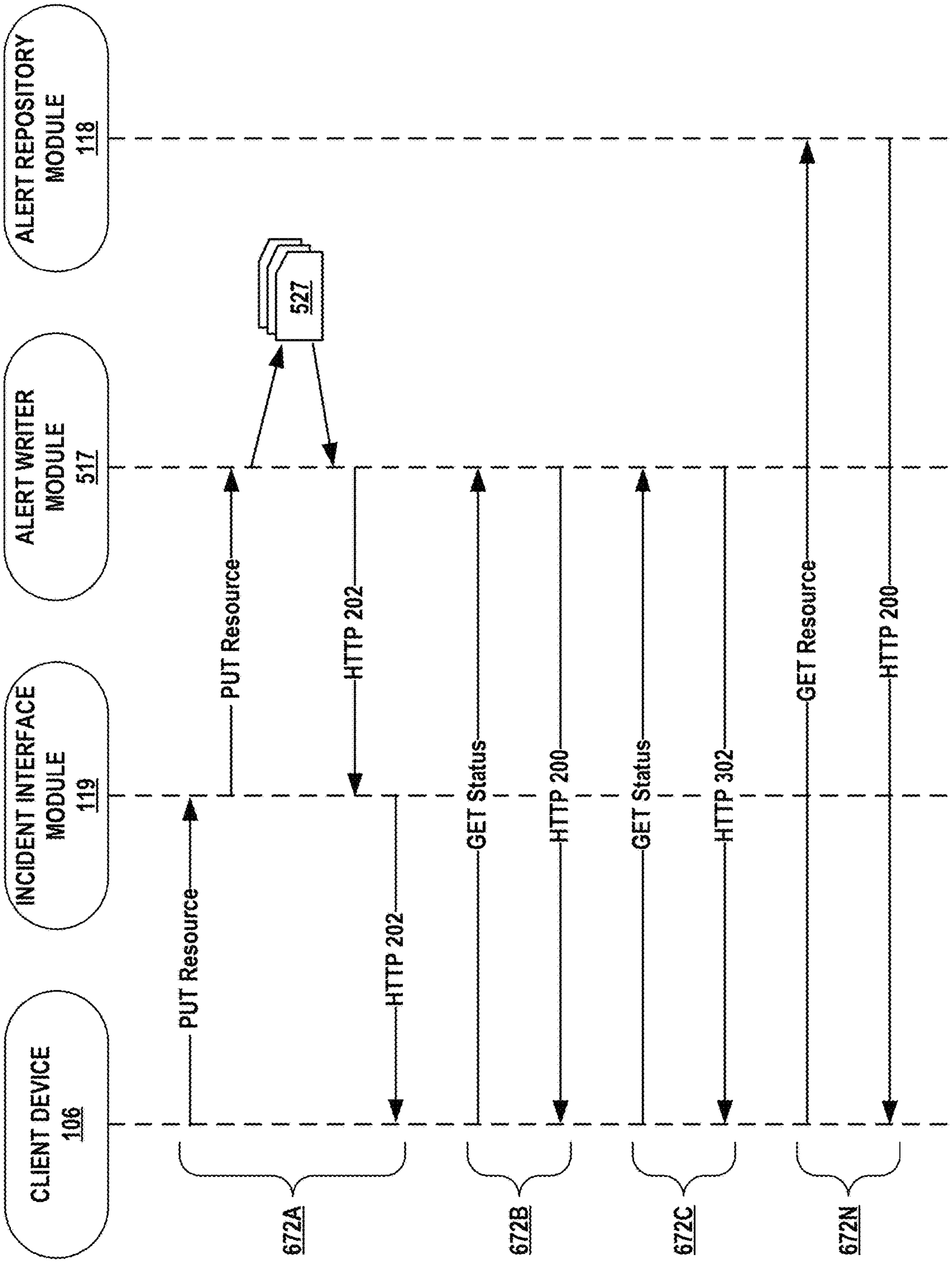
FIG. 6 is a flow chart illustrating a first example of a process for performing user actions, in accordance with the techniques of this disclosure.

FIG. 6 is a flow chart illustrating a first example of a process for performing user actions, in accordance with the techniques of this disclosure. Aspects of FIG. 6 may be described in the context of FIGS. 1-5. The example of FIG. 6 illustrates examples of client interactions 672A-672N (collectively, "client interactions 672") by client device 106 and corresponding operations performed by elements of operations computing system 110, in this example, incident interface module 119, alert writer module 517, and alert repository module 118.

As can be seen, client device 106 may perform client interaction 672A to initiate a user action, such as by sending a HTTP PUT or other request including an indication of the user action (e.g., merge incidents) a user of client device 106 intends to perform. Client device 106 may send the PUT request to incident interface module 119. Incident interface module 119 may send (e.g., forward) the PUT request to alert writer module 517. Alert writer module 517 may process the user action from the PUT request, such as to output one or more units of user actions data to user actions data stream 527. A data stream service of user actions data stream 527 may return an acknowledgement of the PUT request indicating the PUT request has been accepted for processing but processing has not been completed, such as in the form of a HTTP 202 message to incident interface module 119. Incident interface module 119 may send (e.g., forward) the acknowledgement to client 106, which may correspond to the completion of client interaction 672A.

As described above, incident mapping module 116 may process one or more units of user actions data from user actions data stream 527. For example, in this case, incident mapping module 116 may route the one or more units of user actions data to alert processing module 114 and subsequently process alerts data stream 124. Incident mapping module 116 may output one or more units of alert updates data to alert updates data stream 126, such as to facilitate the merging of incidents. For example, alert repository module 118 may process the one or more units of alert updates data from alert updates data stream 126 to update alert information to reflect the merging of incidents indicated by the user action. For example, to merge incidents, alert repository module 118 may update alert information to reflect that the alerts of the source incident are assigned to the target incident, indicate the source incident is resolved, or both.

In the example of FIG. 6, client device 106 may periodically send status requests (e.g., perform polling) to check the status of the original PUT request to perform the user action. For instance, client device 106 may perform one or more client interactions, such as client interaction 672B, to request the status of the PUT request. As can be seen, alert writer module 517 may return a success message to client device 106, such as in the form of an HTTP 200 message including the status of the PUT request. Client device 106 may receive a HTTP 202 message, or the like in response to a status request, until the user action propagates through user actions data stream 527, incident mapping module 116, alert updates data stream 126, and alert repository module 118 to result in alert repository module 118 updating the alert information, as described above. Thereafter, when client device 106 performs a status request, alert writer module may return a redirect message or the like indicating processing of the user action has successfully completed. For example, alert writer module 517 may send a redirect message, such as in the form of a HTTP 302 message, indicating that the PUT request has been processed to completion (e.g., alert repository module 118 has updated the alert information according to the user action), such as shown by client interactions 672C. Client device 106 may perform one or more client interactions, such as client interaction 672N, to request (e.g., query) updated account information from alert repository module 118. Client device 106 may perform client interaction 672N in response to receiving the HTTP 302 or other redirect message. In response to the query, alert repository module 118 may send the requested alert information to client device 106, which may be accompanied by a success message, such as a HTTP 200 message, as shown by client interaction 672N.

As can be seen, operations computing system 110 may propagate user actions through user actions data stream 527, incident mapping module 116, alert updates data stream 126, and alert repository module 118 to result in alert repository module 118 updating the alert information independent of client interactions 672. As such, operations computing system 110 may process the user action asynchronously and provide an indication to client device 106, that processing has been completed when the user action has propagated through operations computing system 110 successfully (e.g., alert repository module 118 has completed updating the alert information based on the user action).

Figure 7:
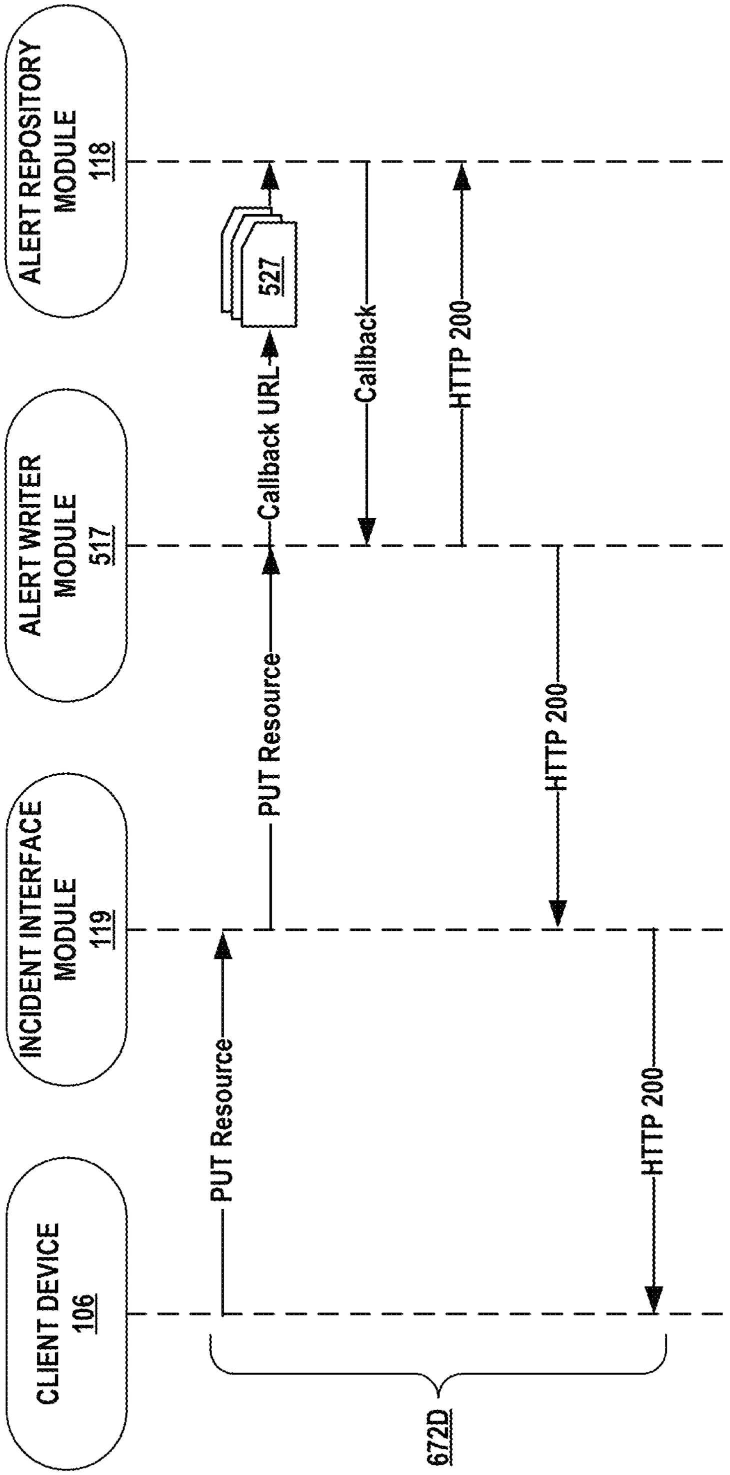
FIG. 7 is a flow chart illustrating a second example of a process for performing user actions, in accordance with the techniques of this disclosure.

FIG. 7 is a flow chart illustrating a second example of a process for performing user actions, in accordance with the techniques of this disclosure. Aspects of FIG. 7 may be described in the context of FIGS. 1-5. The example of FIG. 7 illustrates examples of client interaction 672D by client device 106 and corresponding operations performed by elements of operations computing system 110, in this example, incident interface module 119, alert writer module 517, and alert repository module 118.

In the example of FIG. 7, client device 106 sends a PUT request to the operations computing system 110 requesting a user action (e.g., merge incidents), and operations computing system 110 maintains the connection with client device 106 until the user action is processed or a timeout occurs. As can be seen, client device 106 may submit the PUT request to incident interface module 119. Incident interface module 119 may send (e.g., forward) the PUT request to alert writer module 517. Alert writer module 517 may generate one or more units of user actions data and output the one or more units of user actions data to user actions data stream 527 along with an indication of a callback function (e.g., a callback uniform resource locator (URL)). To process the user action, operations computing system 110 may propagate the user action from user actions data stream 527 to alert repository module 118, such as described above (e.g., propagate through user actions data stream 527, incident mapping module 116, alerts data stream 124, alert processing module 114, alerts data stream 124, and back to incident mapping module 116, and subsequently to alert updates data stream 126, and alert repository module 118 to result in alert repository module 118 updating the alert information). Upon completing processing of the user action, alert repository module 118 may invoke the callback function and thereby indicate to alert writer module 517 that processing has been completed. Alert writer module 517 may acknowledge the callback function, such as by sending a HTTP 200 message back to alert repository module 118. Alert writer module 517 may also or alternatively send a HTTP 200 message to incident interface module 119, which incident interface module 119 may send (e.g., forward) to client device 106. As can be seen, in the example of FIG. 7, client device 106 may avoid performing multiple of client interactions 672, resulting in lower request frequency and lower network bandwidth utilization, lower latency, or both.

Figure 8:
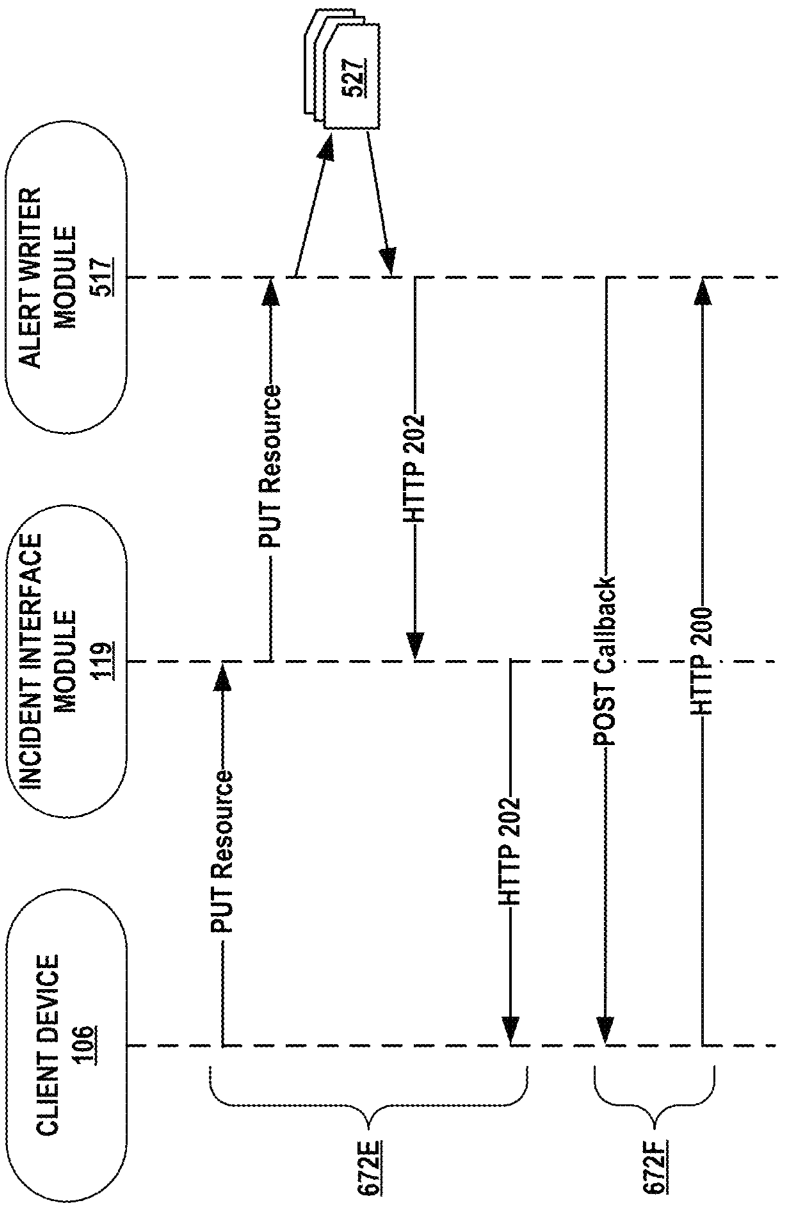
FIG. 8 is a flow chart illustrating a third example of a process for performing user actions, in accordance with the techniques of this disclosure.

FIG. 8 is a flow chart illustrating a third example of a process for performing user actions, in accordance with the techniques of this disclosure. Aspects of FIG. 8 may be described in the context of FIGS. 1-5. The example of FIG. 8 illustrates examples of client interactions 672E, 672F by client device 106 and corresponding operations performed by elements of operations computing system 110, in this example, incident interface module 119, and alert writer module 517.

In the example of FIG. 8, client device 106 may send a PUT request including the user action (e.g., merge incidents) and an indication of a callback function (e.g., callback URL) that alert repository module 118 may use to send (e.g., post) a result to once the user action is processed. As can be seen, client device 106 may perform client interaction 672E by sending the PUT request to incident interface module 119. Incident interface module 119 may send (e.g., forward) the PUT request to alert writer module 517. To process the user action, alert writer module 517 may propagate the user action through user actions data stream 527 to result in alert repository module 118 updating alert information based on the user action, such as described above. Alert writer module 517 may send an acknowledgement indicating the PUT request has been accepted but not processed completely, such as in the form of a HTTP 202 message, back to incident interface module 119. Incident interface module 119 may send (e.g., forward) the HTTP 202 message to client device 106, which may correspond to the completion of client interaction 672E.

Upon completion of processing of the user action, alert writer module 517 may invoke the callback function, also referred to as a webhook, to indicate to client device 106 that the user action has been processed, such as shown by client interaction 672F. Though not shown, alert repository module 118 may indicate to alert writer module 517, such as through one or more HTTP or other messages, that the user action has been processed. Client device 106 may send a success message, such as a HTTP 200 message, to alert writer module 517 to acknowledge invocation of the call back message. As can be seen, in the example of FIG. 8, polling is eliminated thereby reducing requests and corresponding network bandwidth utilization and operations computing system 110 may provide updates to client device 106 in real time by invoking the callback function upon completion processing the user action.

Figure 9:
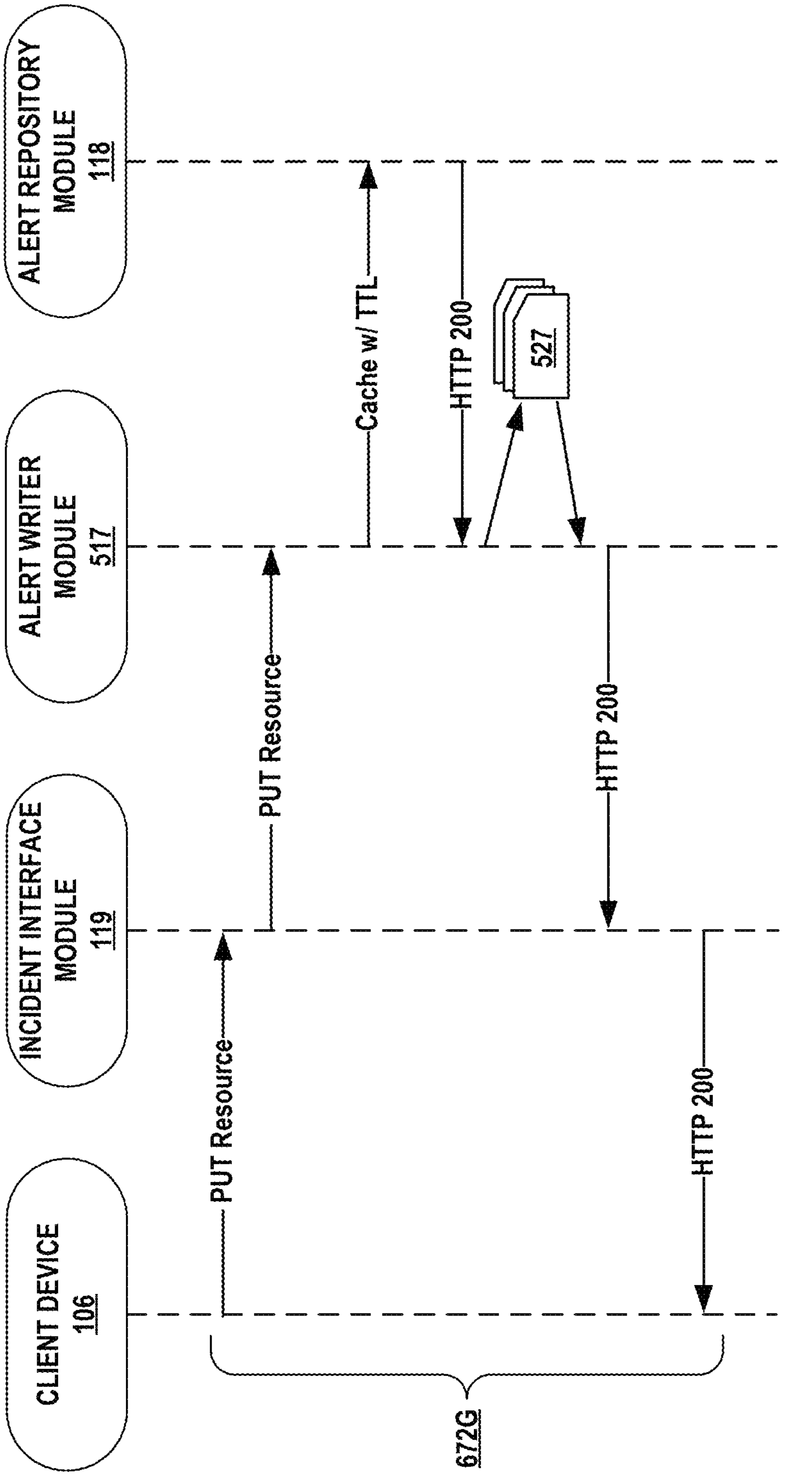
FIG. 9 is a flow chart illustrating a fourth example of a process for performing user actions, in accordance with the techniques of this disclosure.

FIG. 9 is a flow chart illustrating a fourth example of a process for performing user actions, in accordance with the techniques of this disclosure. Aspects of FIG. 9 may be described in the context of FIGS. 1-5. The example of FIG. 9 illustrates examples of client interaction 672G by client device 106 and corresponding operations performed by elements of operations computing system 110, in this example, incident interface module 119, alert writer module 517, and alert repository module 118.

In the example of FIG. 9, alert writer module 517 may cache, with an expiration time (e.g., time to live (TTL), updates to alert information such that these updates are immediately available to client device 106 through the cache. For instance, client device 106 may send a PUT request including a user action (e.g., merge incidents) to incident interface module 119. Incident interface module 119 may send (e.g., forward) the PUT request to alert writer module 517. Alert writer module 517 may cache updates to the alert information based on the user action to a cache (e.g., cache storage) provided by alert repository module 118. For example, alert repository module 118 may determine updates to the account information (e.g., assign one or more alerts from a source incident to a target incident) based on the user action and cache these updates. In some examples, the cache may be independent of any module or be part of alert writer module 517. Once cached, alert repository module 118 or other cache storage service may send, to alert writer module 517, a success message, such as a HTTP 200 message.

Alert writer module 517 may process the user action by propagating the user action through user actions data stream 527 to result in alert repository module 118 updating the alert information based on the user action, such as described above. In this manner, the updates based on the user action may be persisted in the alert information beyond the expiration time of the cache. Once processing of the user action is completed, alert writer module 517 may send a HTTP 200 message to incident interface module 119. Incident interface module 119 may send (e.g., forward) the HTTP 200 message to client 106 to indicate to client that the user action has been processed. While the user action is being processed, alert repository module 118 may service queries from client device 106, corresponding to the updated alert information, from the cache (assuming the cache has not expired). In this manner, operations computing system 110 may seek to provide immediate consistency similar to that of a monolithic architecture using the cache, lower latency as compared to polling, or both.

Figure 10:
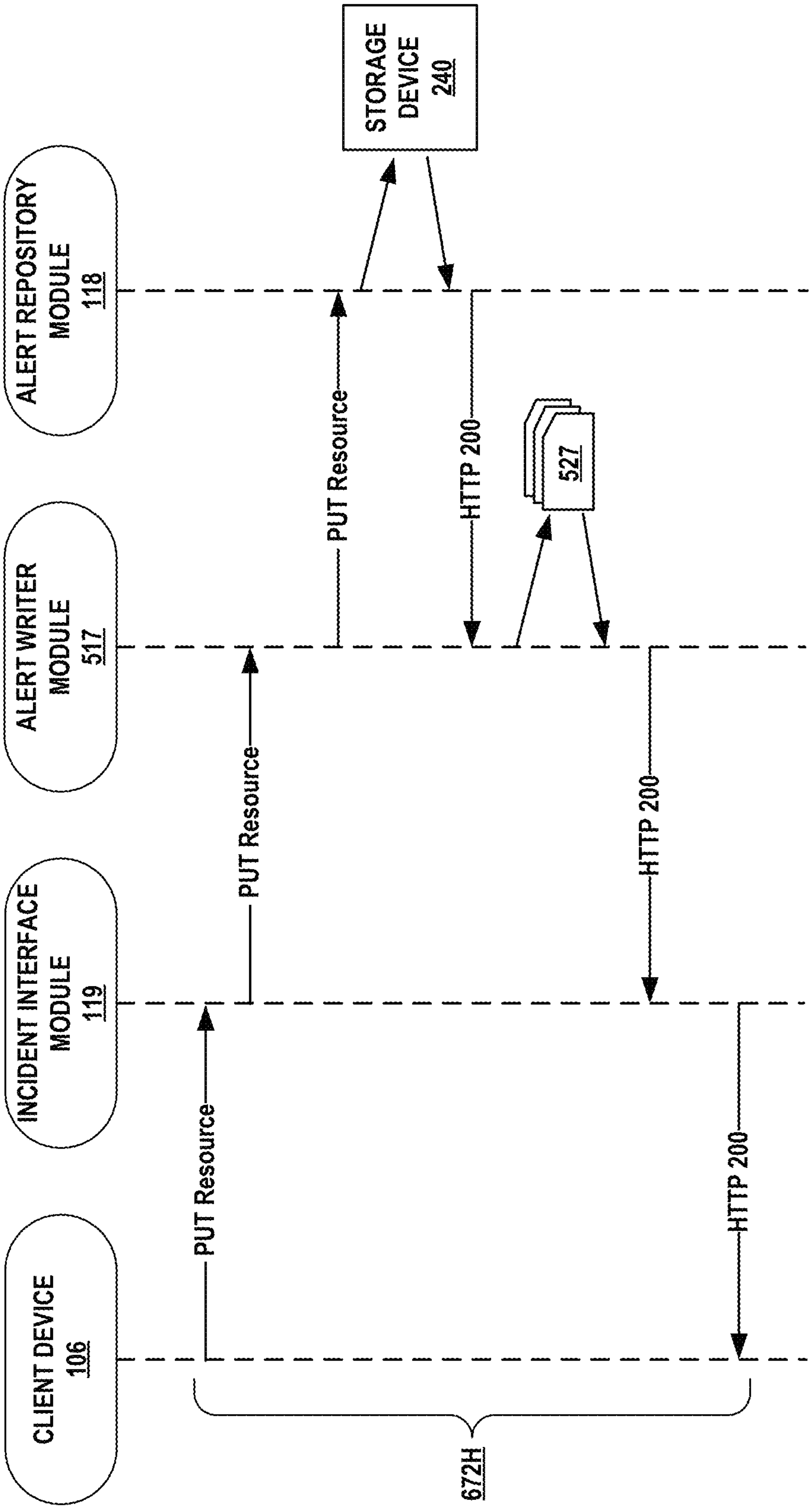
FIG. 10 is a flow chart illustrating a fifth example of a process for performing user actions, in accordance with the techniques of this disclosure.

FIG. 10 is a flow chart illustrating a fifth example of a process for performing user actions, in accordance with the techniques of this disclosure. Aspects of FIG. 10 may be described in the context of FIGS. 1-5. The example of FIG. 10 illustrates examples of client interaction 672H by client device 106 and corresponding operations performed by elements of operations computing system 110, in this example, incident interface module 119, alert writer module 517, and alert repository module 118.

In the example of FIG. 10, alert information is synchronously updated by alert repository module 118. For instance, client device 106 may send a PUT request including a user action (e.g., merge incidents) to incident interface module 119. Incident interface module 119 may send (e.g., forward) the PUT request to alert writer module 517. Alert writer module 517 may send (e.g., forward) the PUT request to alert repository module 118. Alert repository module 118 may update the account information, such as at storage device 240 and, thereafter, send a success message, such as a HTTP 200 message, back to alert writer module 517. By updating the alert information in this manner, alert repository module 118 may ensure immediate consistency similar to that of a monolithic system for alert information updates based on the user action. Alert writer module 517 may propagate the user action through user actions data stream 527 such as to propagate the user alert at least through incident mapping module 116 to allow incident mapping module 116 to process the user alert. Once the user alert is processed, alert writer module 517 may send a HTTP 200 message to incident interface module 119. Incident interface module 119 may send (e.g., forward) the HTTP 200 message to client device 106 to indicate that the user action has been processed. While the user action is being propagated through user actions data stream 527 and at least incident mapping module 116, client device 106 may query updated account information since the account information was previously and synchronously updated by alert repository module 118. In this manner, operations computing system 110 may provide immediate consistency similar to that of a monolithic architecture using the cache, lower latency as compared to polling, or both.

FIGS. 6-10 may represent various techniques operations computing system 110 may perform to process user actions asynchronously. As can be seen from the examples of FIGS. 6-10, operations computing system 110 may operate in an eventually consistent fashion by propagating a user action through modules of operations computing system 110, where each module may asynchronously process the user action. Operations computing system 110 may complete a user action by indicating to client device 106 when processing of the user action is fully propagated (e.g., fully processed). Though described above from the perspective of modules, these modules may perform the operations described above by invoking one or more service functions 115, such as described above. Operations computing system 110 may send tracked metadata 468 between service functions 115, including service functions within a particular module in a different module, such as by sending one or more messages 462 including tracked metadata 468 to invoked service functions 115.

Figure 11:
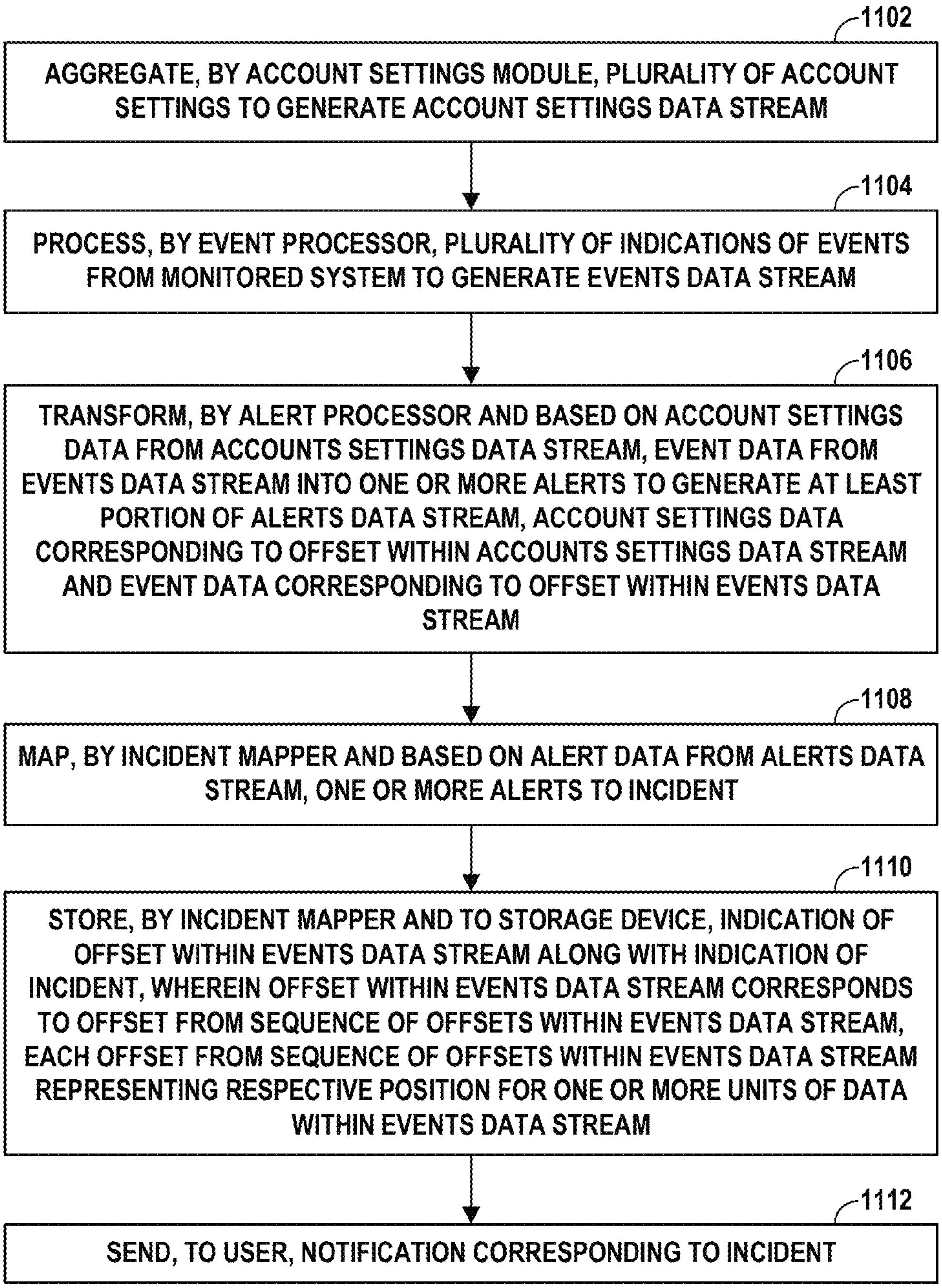
FIG. 11 is a flow chart illustrating a first example of a process for asynchronous incident response actions, in accordance with the techniques of this disclosure.

FIG. 11 is a flow chart illustrating a first example of a process for asynchronous incident response actions, in accordance with the techniques of this disclosure. Aspects of FIG. 11 are described below in the context of FIGS. 1-5.

Operations computing system 110 may aggregate, with account settings module 112, a plurality of account settings to generate account settings data stream 122B (1102). For example, account settings module 112 may receive account settings from one or more of repository systems 105 and aggregate the account settings to output one or more units of account settings data to account settings data stream 122B. Account settings module 112 may perform batching on account settings to aggregate the account settings, such as described above.

Operations computing system 110 may process, with event processing module 111, a plurality of indications of events from monitored system 103 to generate events data stream 121B (1104). For example, event processing module 111 may output one or more units of events data to events data stream 121B. The one or more units of events data may represent the indications of events. The indications of events may represent events that occurred at monitored system 103.

Operations computing system 110 may transform, with alert processing module 114 and based on account settings data from accounts settings data stream 122B, events data from events data stream 121B into one or more alerts to generate at least a portion of alerts data stream 124 (1106). The account settings data may correspond to an offset within accounts settings data stream 122B and the events data may correspond to an offset within events data stream 121B. For example, the account settings data may be one or more units of accounts settings data at the offset within accounts settings data stream 122B and the events data may be one or more units of events data at the offset within events data stream 121B. Alert processing module 114 may determine one or more criteria for transforming the events data into the one or more alerts and transform the account settings data into the one or more alerts based on the one or more criteria. The one or more criteria may be part of transformation information that alert processing module 114 may determine from one or more units of accounts settings data from account settings data stream 122B. For example, transformation information may include one or more criteria for transforming event data into one or more alerts, such as when one or more characteristics of the event represented by the event data satisfy the one or more criteria for the one or more alerts.

Alert processing module 114 may assign the one or more alerts to an alert set, such as in accordance with grouping information from the account settings information. For example, the grouping information may include one or more criteria for assigning an alert to an alert set, such as when one or more characteristics of the action satisfy the one or more criteria of the action set. Alert processing module 114 may output one or more units of alerts data including indications the one or more alerts to alerts data stream 124. In some examples, the one or more alerts may correspond to an alert set.

Operations computing system 110 may map, with incident mapping module 116 and based on alerts data from alerts data stream 124, the one or more alerts to an incident (1108). The one or more alerts may represent an alert set generated by alert processing module 114. The alerts data may be one or more units of alerts data from alerts data stream 124 including the one or more alerts. Incident mapping module 116 may map the one or more alerts to an incident based on mapping information, such as from the account settings data described above and/or other accounts settings data from account settings data stream 122B. The mapping information may include one or more criteria for mapping one or more alerts to an incident, such as when one or more characteristics of the one or more alerts satisfy the one or more criteria for the incident.

Operations computing system 110 may store, with incident mapping module 116 and to storage device 240, an indication of the offset within events data stream 121B along with an indication of the incident (1110). The offset within the events data stream may be an offset from a sequence (e.g., an ordered sequence) of offsets within the events data stream. Each offset from the sequence of offsets within the events data stream may represent a respective position for one or more units of events data within the events data stream. In some examples, the offset may be passed, such as part of tracked metadata, between at least alert processing module 114 and incident mapping module 116 and/or respective service functions 115 of these modules. For example, operations computing system 110 may receive, with a service function 115D of incident mapping module 116 and from a service function 115C of alert processing module 114, tracked metadata that indicates the offset within the events data stream. Incident mapping module 116 may determine, based on the tracked metadata, the indication of the offset within the events data stream 121B. Operations computing system 110 may store the indication of the offset within the events data stream and the indication of the offset within the account settings data stream along with the indication of the incident. By storing the indication of the offset, operations computing system 110 may store a log of tracked metadata including at least the offset, such as for diagnosis purposes (e.g., the debugging, tracing, tracking, monitoring, and other purposes described above). Alert repository module 118 may retrieve a log for the incident including the offset within account settings data stream 122B and the offset within events data stream 121B.

Operations computing system 110 may send, to a user, a notification corresponding to the incident (1112). For example, operations computing system 110 may send, such as through incident interface module 119 or another element of operations computing system 110, the notification corresponding to the incident to client device 106 and client device 106 may present the notification to the user. Alert processing module 114 may determine user information from the account settings data of account settings data stream 122B. Alert processing module 114 may identify, from a plurality of users, the user based on the user information. For example, the user information may include a user identifier that indicates the user of the plurality of users to which the notification corresponding to the incident should be sent.

Operations computing system 110 may store an indication that the events data corresponding to the offset within the events data stream was processed. Operations computing system 110 may refrain, for each respective offset of events data stream 121B that corresponds to an indication that the events data corresponding to the respective offset was processed, from transforming the events data corresponding to the respective offset. In this manner operations computing system 110 may ensure idempotency for processing of events data.

Figure 12:
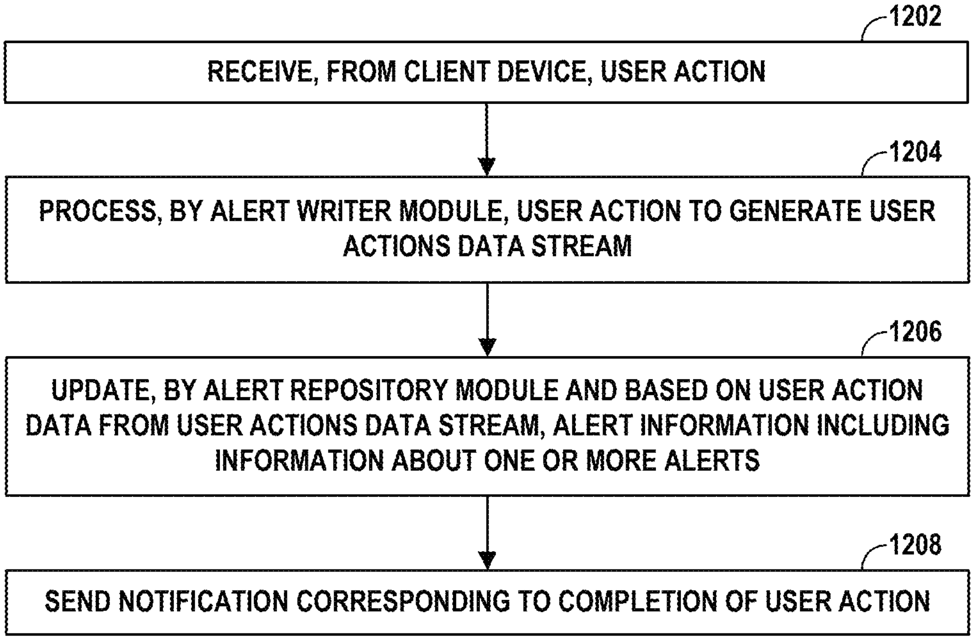
FIG. 12 is a flow chart illustrating a second example of a process for asynchronous incident response actions, in accordance with the techniques of this disclosure.

FIG. 12 is a flow chart illustrating a second example of a process for asynchronous incident response actions, in accordance with the techniques of this disclosure. Aspects of FIG. 11 are described below in the context of FIGS. 1-5. As compared to the example of FIG. 1, the example of FIG. 2 illustrates receipt and processing of user actions, which may be received by operations computing system 110 from users at client devices 106.

Operations computing system 110 may receive, from a client device 106, a user action (1202). The user action may be one or more of assigning the one or more alerts to a second incident, updating the one or more alerts, merging the first incident and the second incident, creating a third incident, and resolving the first incident. Operations computing system 110 may process, with alert writer module 517, the user action to generate user actions data stream 527 (1204).

For example, alert writer module 517 may output one or more units of user actions data including an indication of the received user action to user actions data stream 527. Operations computing system 110 may update, with alert repository module 118 and based on user actions data from user actions data stream 527, alert information including information about the one or more alerts (1206). In one example, incident mapping module 116 may merge incidents in response to the user action. For instance, incident mapping module 116 may map, based on the user actions data, the one or more alerts of a first incident to a second incident. To update the alert information, alert repository module 118, may update the alert information to indicate the one or more alerts are mapped to the second incident rather than the first incident. Operations computing system 110 may send a notification corresponding to completion of the user action (1208). For example, alert repository module 118 may send or cause incident interface module 119 to send the notification to the user to indicate to the user that the user action has been completed.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

aggregating, by an account settings module of a computing system, a plurality of account settings to generate an account settings data stream;

processing, by an event processing module of the computing system, a plurality of indications of events from a monitored system to generate an events data stream;

transforming, by an alert processing module of the computing system and based on account settings data from the accounts settings data stream, events data from the events data stream into one or more alerts to generate at least a portion of an alerts data stream, the account settings data corresponding to an offset within the accounts settings data stream and the events data corresponding to an offset within the events data stream;

mapping, by an incident mapping module of the computing system and based on alerts data from the alerts data stream, the one or more alerts to an incident; and storing, by the incident mapping module and to a storage device, an indication of the offset within the events data stream along with an indication of the incident, wherein the offset within the events data stream corresponds to an offset from a sequence of offsets within the events data stream, each offset from the sequence of offsets within the events data stream representing a respective position for one or more units of data within the events data stream.

2. The method of claim 1, further comprising:

receiving, by the computing system and from a client device, a user action;

processing, by an alert writer module of the computing system, the user action to generate a user actions data stream;

updating, by an alert repository module of the computing system and based on user actions data from the user actions data stream, alert information including information about the one or more alerts; and sending, by the computing system, a notification corresponding to completion of the user action.

3. The method of claim 2, wherein the incident is a first incident, the method further comprising:

mapping, by the incident mapping module and based on the user actions data, the one or more alerts to a second incident, wherein updating the alert information comprises updating, by the alert repository module, the alert information to indicate the one or more alerts are mapped to the second incident rather than the first incident.

4. The method of claim 2, wherein the incident is a first incident and the user action is one or more of assigning the one or more alerts to a second incident, updating the one or more alerts, merging the first incident and the second incident, creating a third incident, and resolving the first incident.

5. The method of claim 1, further comprising receiving, by a service function of the incident mapping module and from a service function of the alert processing module, tracked metadata that indicates the offset within the events data stream, wherein the incident mapping module stores the indication of the offset within the events data stream along with the indication of the incident to generate a log for diagnosis purposes.

6. The method of claim 5, further comprising determining, by the incident mapping module and based on the tracked metadata, the indication of the offset within the events data stream.

7. The method of claim 1, wherein storing the indication of the offset within the events data stream along with the indication of the incident comprises storing, by the computing system, an indication of the offset within the events data stream and the indication of the offset within the account settings data stream along with the indication of the incident.

8. The method of claim 1, further comprising:

determining, by the alert processing module, at least user information from the account settings data;

identifying, by the alert processing module and from a plurality of users, a user based on the user information; and sending, by the computing system and to the user, a notification corresponding to the incident.

9. The method of claim 1, further comprising determining, by the alert processing module, mapping information from the account settings data, wherein mapping the one or more alerts to the incident is based on the mapping information.

10. The method of claim 1, further comprising determining, by the alert processing module, one or more criteria for transforming the events data into the one or more alerts, wherein transforming the events data into the one or more alerts is based on the one or more criteria.

11. The method of claim 1, further comprising:

storing, by the computing system, an indication that the events data corresponding to the offset within the events data stream was processed; and refraining, by the computing system and for each respective offset of the events data stream that corresponds to an indication that the events data corresponding to the respective offset was processed, from transforming the events data corresponding to the respective offset.

12. The method of claim 1, further comprising retrieving, by an alert repository module of the computing system, a log for the incident including the offset within the account settings data stream and the offset within the events data stream.

13. A computing system comprising:

a memory that stores instructions;

one or more processors that execute the instructions to:

aggregate, with an account settings module, a plurality of account settings to generate an account settings data stream;

process, with an event processing module, a plurality of indications of events from a monitored system to generate an events data stream;

transform, with an alert processing module and based on account settings data from the accounts settings data stream, events data from the events data stream into one or more alerts to generate at least a portion of an alerts data stream, the account settings data corresponding to an offset within the accounts settings data stream and the events data corresponding to an offset within the events data stream;

map, with an incident mapping module and based on alerts data from the alerts data stream, the one or more alerts to an incident; and store, with the incident mapping module and to a storage device, an indication of the offset within the events data stream along with an indication of the incident, wherein the offset within the events data stream corresponds to an offset from a sequence of offsets within the events data stream, each offset from the sequence of offsets within the events data stream representing a respective position for one or more units of data within the events data stream.

14. The computing system of claim 13, wherein the one or more processors execute the instructions to:

receive, from a client device, a user action;

process, with an alert writer module, the user action to generate a user actions data stream;

update, with an alert repository module and based on user actions data from the user actions data stream, alert information including information about the one or more alerts; and send a notification corresponding to completion of the user action.

15. The computing system of claim 13, wherein the one or more processors execute the instructions to receive, with a service function of the incident mapping module and from a service function of the alert processing module, tracked metadata that indicates the offset within the events data stream, wherein the incident mapping module stores the indication of the offset within the events data stream along with the indication of the incident to generate a log for diagnosis purposes.

16. The computing system of claim 13, wherein to store the indication of the offset within the events data stream along with the indication of the incident the one or more processors execute the instructions to store an indication of the offset within the events data stream and the indication of the offset within the account settings data stream along with the indication of the incident.

17. The computing system of claim 13, wherein the one or more processors execute the instructions to:

determine, with the alert processing module, at least user information from the account settings data;

identify, with the alert processing module and from a plurality of users, a user based on the user information; and send, to the user, a notification corresponding to the incident.

18. The computing system of claim 13, wherein the one or more processors execute the instructions to:

store an indication that the events data corresponding to the offset within the events data stream was processed; and refrain, for each respective offset of the events data stream that corresponds to an indication that the events data corresponding to the respective offset was processed, from transforming the events data corresponding to the respective offset.

19. The computing system of claim 13, wherein the one or more processors execute the instructions to retrieve, with an alert repository module of the computing system, a log for the incident including the offset within the account settings data stream and the offset within the events data stream.

20. Non-transitory computer-readable storage media storing instructions that, when executed by one or more processors, cause the one or more processors to:

aggregate, with an account settings module, a plurality of account settings to generate an account settings data stream;

process, with an event processing module, a plurality of indications of events from a monitored system to generate an events data stream;

transform, with an alert processing module and based on account settings data from the accounts settings data stream, events data from the events data stream into one or more alerts to generate at least a portion of an alerts data stream, the account settings data corresponding to an offset within the accounts settings data stream and the events data corresponding to an offset within the events data stream;

map, with an incident mapping module and based on alerts data from the alerts data stream, the one or more alerts to an incident; and store, with the incident mapping module and to a storage device, an indication of the offset within the events data stream along with an indication of the incident, wherein the offset within the events data stream corresponds to an offset from a sequence of offsets within the events data stream, each offset from the sequence of offsets within the events data stream representing a respective position for one or more units of data within the events data stream.

* * * * *